(12) United States Patent
Cotugno et al.

(10) Patent No.: US 6,198,480 B1
(45) Date of Patent: Mar. 6, 2001

(54) OBJECT-ORIENTED TAG BROWSER

(75) Inventors: Steven Cotugno, San Juan Capistrano; Jay Cook, Costa Mesa; Brian Erickson, Long Beach, all of CA (US)

(73) Assignee: Wonderware Corporation, Irvine, CA (US)

( * ) Notice: Subject to any disclaimer, the term of this patent is extended or adjusted under 35 U.S.C. 154(b) by 0 days.

(21) Appl. No.: 09/240,043

(22) Filed: Jan. 29, 1999

Related U.S. Application Data

(60) Provisional application No. 60/103,356, filed on Oct. 7, 1998.

(51) Int. Cl.[7] .................................................. G06F 3/00
(52) U.S. Cl. ............................................ 345/333; 707/526
(58) Field of Search .................................... 707/526, 500; 345/356, 357, 339, 333; 717/17; 709/217–219

(56) References Cited

U.S. PATENT DOCUMENTS

| | | | |
|---|---|---|---|
| 4,953,080 | 8/1990 | Dysart et al. ........................ 364/200 |
| 5,243,594 | 9/1993 | Dasch et al. ........................ 370/61 |
| 5,287,447 | 2/1994 | Miller et al. ........................ 395/157 |
| 5,367,623 | 11/1994 | Iwai et al. ........................ 395/157 |
| 5,386,360 | * 1/1995 | Wilson et al. ........................ 717/17 |
| 5,426,421 | * 6/1995 | Gray ........................ 717/17 X |
| 5,432,903 | 7/1995 | Frid-Nielsen ........................ 395/361 |
| 5,440,741 | 8/1995 | Morales et al. ........................ 395/650 |
| 5,485,620 | 1/1996 | Sadre et al. ........................ 395/700 |
| 5,611,059 | * 3/1997 | Benton et al. ........................ 717/17 X |
| 5,682,532 | 10/1997 | Remington et al. ........................ 395/683 |
| 5,724,272 | 3/1998 | Mitchell et al. ........................ 364/579 |
| 5,732,271 | 3/1998 | Berry et al. ........................ 395/683 |
| 5,815,703 | 9/1998 | Copeland et al. ........................ 395/613 |
| 5,822,527 | 10/1998 | Post ........................ 395/200.36 |
| 5,844,554 | 12/1998 | Geller et al. ........................ 345/333 |
| 5,862,395 | 1/1999 | Bier ........................ 395/800.001 |
| 5,867,707 | 2/1999 | Nishida et al. ........................ 395/685 |
| 5,878,260 | 3/1999 | Copeland et al. ........................ 395/702 |
| 5,909,372 | * 6/1999 | Thybo ........................ 717/17 X |
| 5,933,601 | 8/1999 | Fanshier et al. ........................ 395/200 |
| 5,951,680 | 7/1999 | Redlin et al. ........................ 713/1 |
| 5,963,958 | 10/1999 | Cottrill ........................ 707/104 |
| 5,974,410 | 10/1999 | Copeland et al. ........................ 707/103 |
| 5,980,078 | * 11/1999 | Krivoshein et al. ........................ 717/17 X |

OTHER PUBLICATIONS

Claverie, Steven D., "Working the 'Net: Developing Applications with the Internet Information Server and Visual Basic ActiveX Controls," ACM, Apr. 1998, pp. 158–162.

* cited by examiner

Primary Examiner—Joseph H. Feild
(74) Attorney, Agent, or Firm—Cooley Godward LLP; Kevin J. Zimmer

(57) ABSTRACT

A system and method for displaying representations of tag sources representative of corresponding component devices is disclosed herein. The present system includes a tag dictionary for defining the tag sources in a predefined object-oriented format. The tag dictionary is comprised of tag definition objects, each containing information relating to a given tag source and each being associated with a tag type object. A tag browser allows for display and editing of the tag source representations in accordance with the tag definition objects. In a preferred implementation each of the representations includes information relating to a predefined set of parameters characterizing the tag sources. The tag browser also optionally includes a tag filter for causing display of those tag source representations comporting with tag selection criteria, and for suppressing display of all other tag source representations. A template tag dictionary is preferably provided within a development environment to facilitate generation of each tag dictionary. The template tag dictionary is modified within this development environment to reflect attributes of the tag sources. One or more template object-oriented controls of a predefined format compatible with the tag dictionary may also be provided in the development environment. These template object-oriented controls may be modified within the development environment so as to create a representation of each tag source of interest.

22 Claims, 14 Drawing Sheets

Microfiche Appendix Included
(2 Microfiche, 105 Pages)

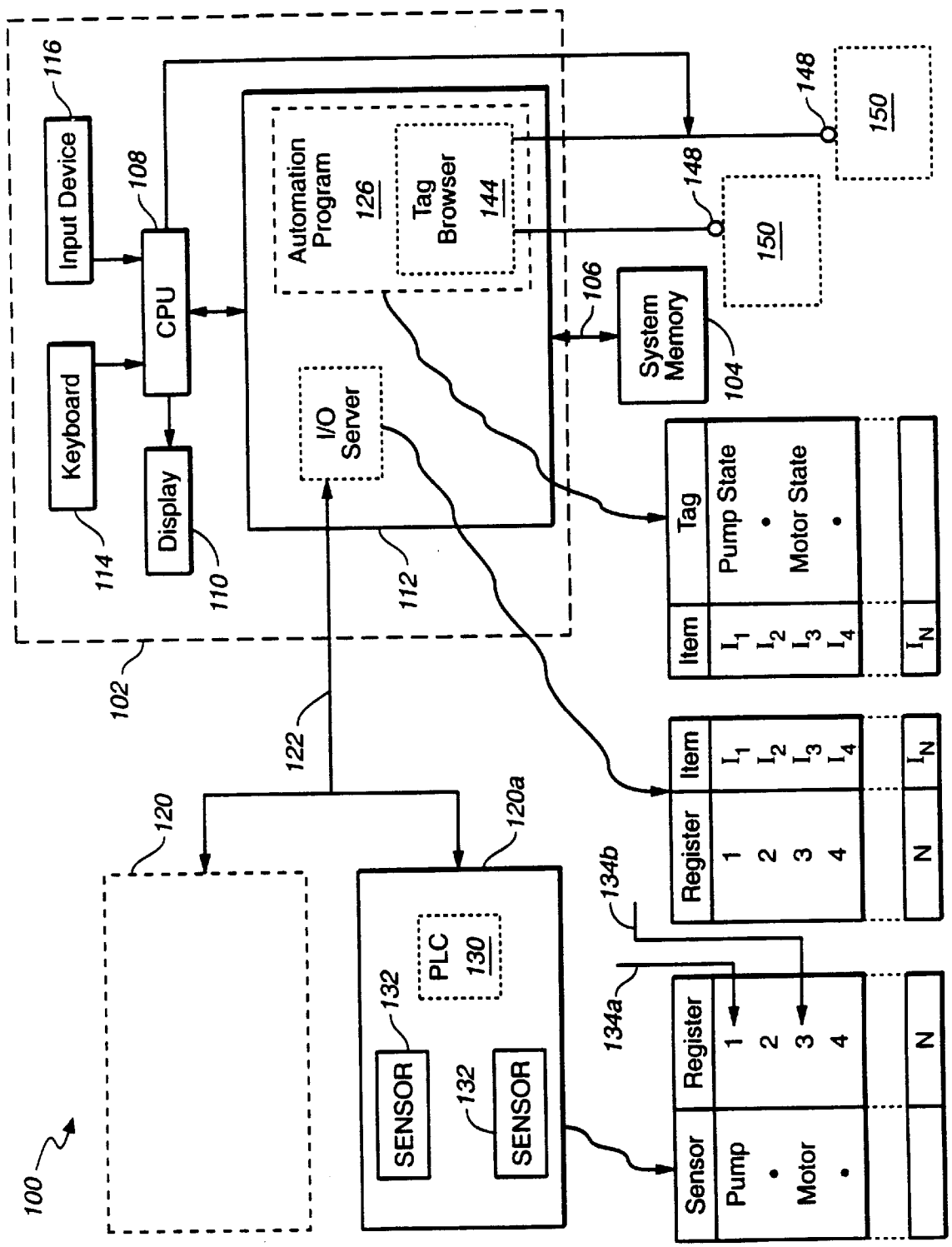
FIG._1

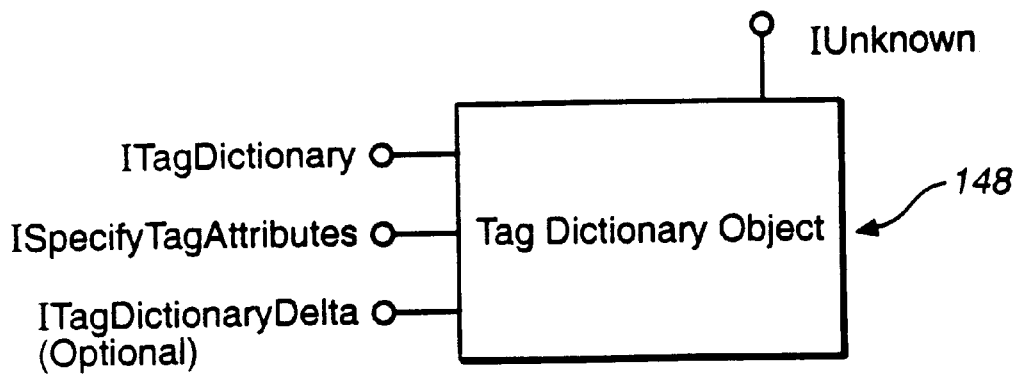
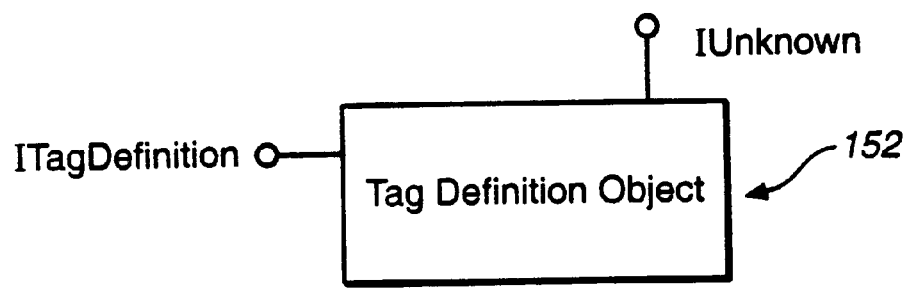
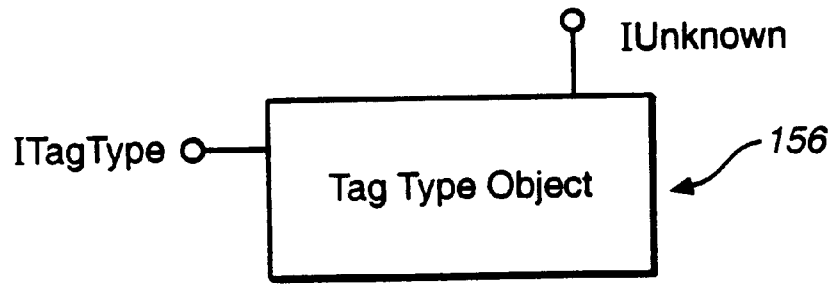
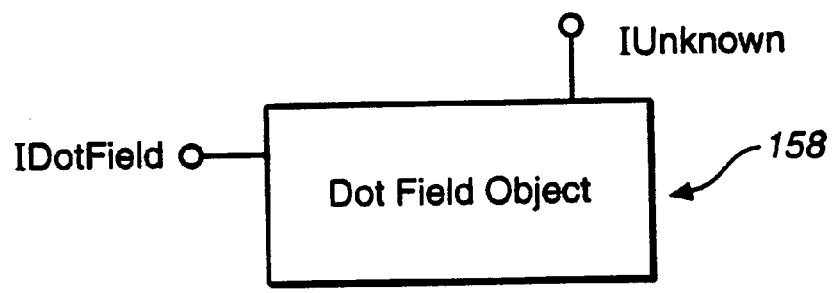
FIG._2

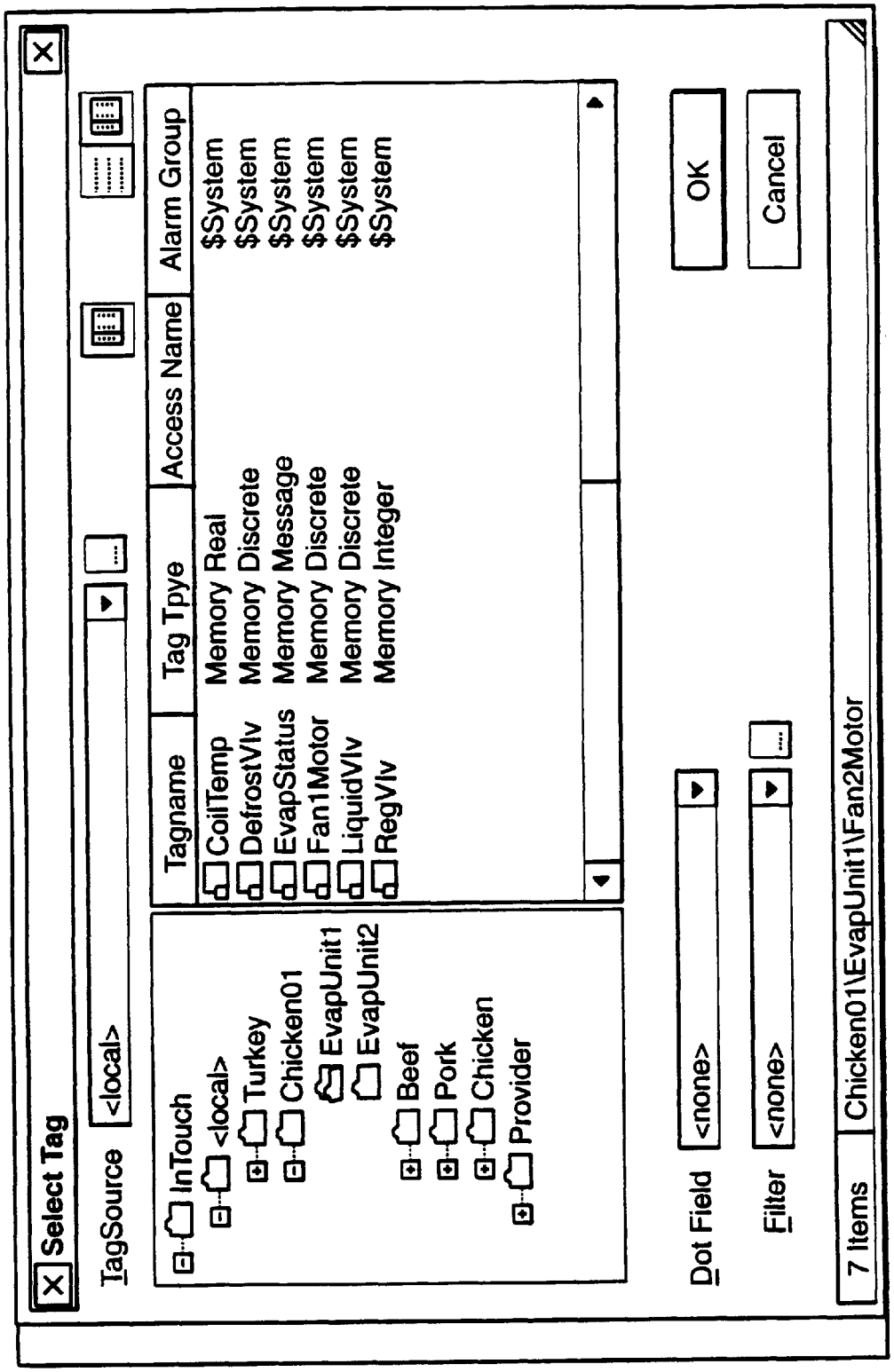
FIG._3

OBJECT-ORIENTED TAG BROWSER

CROSS-REFERENCE TO RELATED APPLICATIONS

This application claims the benefit under Title 35, United States Code, § 119(e) of U.S. provisional application No. 60/103,356 filed on Oct. 7, 1998.

FIELD OF THE INVENTION

This invention relates generally to industrial automation and control systems and, more particularly, to software for identifying and viewing representations of sensing and control devices included within such systems.

MICROFICHE APPENDIX

This application includes a Microfiche Appendix filed herewith, which comprises 2 pages and 105 frames.

BACKGROUND OF THE INVENTION

The operation of industrial equipment such as assembly lines, machine tools and processing equipment is often governed by an automation controller in accordance with a stored program. In conventional automation controllers, the control program is stored in a memory and includes instructions which are read out in rapid sequence and executed to examine the condition of selected sensing devices on the controlled equipment, or to energize or de-energize selected operating devices on the controlled equipment contingent on the status of one or more of the examined sensing devices.

Large controllers typically consist of a number of modules with different functions assigned to each module. For example, one module may execute the user control program, another may interface the controller to the remote sensing and operating devices, and yet another module may control communications with a host computer via a local area network. This arrangement permits one or more human operators to monitor and control an industrial process via computer workstations.

As part of this monitoring process, it is desirable that the control program be capable of presenting the human operator with some type of representation of the parameters of the various sensing devices associated with a given industrial process. Such a representation (hereinafter, a "tag") would enable an operator to, for example, specify a set of sensing devices for which parameter measurements would be displayed by the control program. Unfortunately, display and selection of the various tags associated with a given industrial process is communicated by the fact that proprietary software is currently utilized to provide interfaces for such tags. Accordingly, an industrial control program needs to include code peculiar to each type of tag for which parameter measurements are to be displayed by the control program. In addition, mechanisms are not available for centralized monitoring of the tags representative of sensing devices monitored by more than one industrial control program.

SUMMARY OF THE INVENTION

Briefly, the present invention provides a system and method for displaying representations of tag sources corresponding to various component devices of a process control system or the like. The inventive system includes a tag dictionary for defining the tag sources in a predefined object-oriented format. The tag dictionary is comprised of tag definition objects, each containing information relating to a given tag source and each being associated with a tag type object. The system of the invention also includes a tag browser for displaying and editing the representations of the tag sources in accordance with the tag definition objects. In a preferred implementation each of the representations includes information relating to a predefined set of parameters characterizing the tag sources. The tag browser also optionally includes a tag filter for causing display of those tag source representations comporting with tag selection criteria and for suppressing display of all other tag source representations.

A template tag dictionary is preferably provided within a development environment to facilitate generation of each tag dictionary. The template tag dictionary is modified within this development environment to reflect attributes of the tag sources. One or more template object-oriented controls of a predefined format compatible with said tag dictionary may also be provided in development environment. These template object-oriented controls may be modified within the development environment so as to create a representation of each tag source of interest.

BRIEF DESCRIPTION OF THE DRAWINGS

In the accompanying drawings:

FIG. 1 is a block diagram of a computer system in which the present invention may be implemented.

FIGS. 2a–2d provide a representation of a tag dictionary of the present invention implemented as a COM object.

FIG. 3 is an illustrative representation of a dialog bog preferably generated upon user invocation of a tag browser of the present invention.

DETAILED DESCRIPTION OF THE INVENTION

Overview

Figure 4:
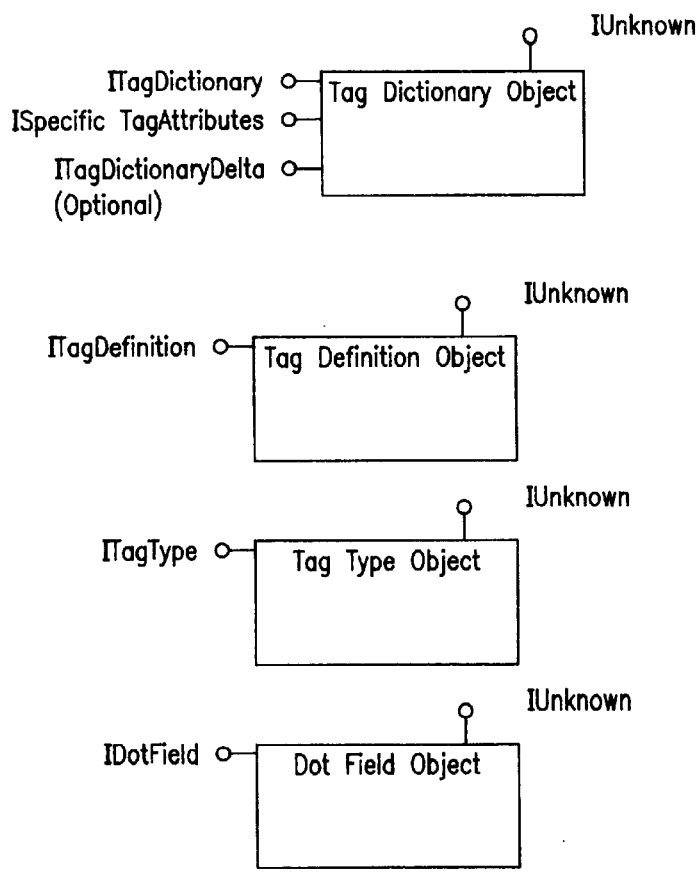
FIG. 4 depicts a tag dictionary object comprised of a collection of tag definition objects.

FIG. 1 is a block diagram of a computer system 100 in which the present invention may be implemented. The computer system 100 includes a computer workstation 102 that communicates with a system storage unit over network 106. The system storage unit 104 comprises a direct access storage device, such as magnetic disk storage, in which data files are stored. The workstation 102 includes a central processing unit ("CPU") 108, a display 110, and a main memory 112. The CPU 108 operates in response to user commands, which it receives via a keyboard 114 or a display mouse 116. The computer workstation 102 can communicate with one or more other user stations or a network server unit over the network 106.

The main memory 112 contains a variety of data structures and information, including an operating system, application programs, program objects, and user data. The main memory is represented as a single entity, but those skilled in the art will appreciate that the main memory can comprise a combination of random access memory ("RAM"), hard disk drives, optical disk drives, and other storage devices containing logically segmented storage locations. The main memory includes a computer program (described hereinafter) containing a sequence of program instructions whose execution implements the present invention.

The operating system contained in the memory 112 supports an object-oriented programming environment for the execution of object-oriented programs, such as those written in, for example, the C++ programming language. Accordingly, the memory contains program objects that are data structures of an object-oriented programming language. Application programs are invoked, or launched, by a user through the keyboard 114 or graphical input device 116. The application programs can be written in a variety of languages, including C++.

The display 110 comprises a display device such as a video terminal that displays computer output and indicates system operations. Display objects can be pictured on the display and the user can designate data operations on the display by using the mouse 116 or equivalent graphical user input device.

In an exemplary implementation the computer system 100 sends commands to, and receives data from, one or more industrial sensor or process control devices 120 via a data bus 122. The state of each such device 120 is reflected by the value of an associated tag, each of which may be a parameter of the container application. The automation program 126 interfaces with the process control devices 120 by way of an input/output ("I/O") server module 128

In the exemplary implementation the container application comprises an industrial automation software program 126, such as the InTouch program module developed by Wonderware Corporation of Irvine, Calif. The Wonderware Intouch module includes a tool kit for building screens and interfaces, a graphical user interface for monitoring and controlling the devices 120, and a mechanism for establishing appropriate database server links. The InTouch program is disposed to interact with objects developed in accordance with the format known as "ActiveX" (i.e., objects based upon the Object Linking and Embedding ("OLE") developed by Microsoft Corporation).

An exemplary process control device 120a is implemented using a programmable logic controller ("PLC") 130 and one or more sensors 132. The PLC 130 will typically include a set of registers 134 or the like for storing parameter information characterizing the sensors 132.

Such parameter information could include, for example, the type of value (e.g., integer) returned by a given sensor. Since the parameter information associated with different sensors 132 is of differing formats, the I/O server module 128 functions to convert the parameter information from the sensors 132 into a format useable by the automation program 126. As indicated by FIG. 1, a register 134a holds parameter information for a sensor 132 identified as "pump", and a register 134b holds parameter information for a sensor 132 identified as "motor". The I/O server similarly includes a table 140 in which an index item I1 holds converted parameter information from register 134a, and in which an index item I3 holds converted parameter information from register 134b. In like manner the automation program 126 defines a table 142 configured to create an association between the tags monitored by the automation program 126 and the index items of the table 140. For example, the tag PumpState is seen to correspond to index item I1 and the tag MotorState is seen to correspond to index item I3. In this way the I/O server obviates the need for the automation program 126 to contain code specific to each type of sensor 132 in order to access relevant parameter information.

Structure of Tag Browser and Tag Dictionary

In accordance with one aspect of the invention, a tag browser 144 and tag dictionary 148 cooperate to enable a user of automation program 126 to view the parameters of tags associated with sensing devices controlled by other automation programs 150. In the exemplary embodiment of FIG. 1, the other automation programs 150 are installed on workstations (not shown) distinct from the workstation 102. The tag dictionary 148 is preferably implemented within the same process space as the automation program 126 as an object comporting with the Component Object Model ("COM") specified by the Microsoft Corporation. In the preferred embodiment, each source of tags, ("tag source") viewable using the tag browser 144 is instantiated as an ActiveX control and is made accessible to the browser 144 via the tag dictionary 148.

FIGS. 2a–2d provide a representation of the tag dictionary 148 implemented as a COM object. The tag dictionary 148 comprises a collection of tag definition objects 152. Each tag definition 152 defines properties characterizing a given tag. Associated with each tag definition object 152 is a tag type object 156 comprised of a plurality of dot field objects 158. In response to user selection of a tag source via the tag browser interface (FIG. 3), the tag browser 144 instantiates a tag dictionary 148 corresponding to the selected tag source. The tag browser 144 then enumerates the tag definition objects 152 of the instantiated tag dictionary 148, as well as the tag type objects 156 and dot field objects 158 for each tag definition object 52.

Exemplary sets of properties and methods applicable to the tag definition objects 152, tag type objects 156 and dot field objects 158 are set forth in the section below entitled "Reference Guide". In addition, the Microfiche Appendix includes source code for generating generic "templates" of the tag dictionary 148. Such template tag dictionaries may be adapted for implementation with specific tag sources in accordance with the teachings herein.

FIG. 3 is illustrative representation of a dialog bog preferably generated upon user invocation of the tag browser 144. Such invocation may be effected through, for example, one or more predefined operations involving graphical user input device 116 (e.g., "double-clicking" in a blank portion of the automation program interface). Referring to FIG. 3, the tags available for viewing by an operator of the automation program 126 are included within an "InTouch" directory having "<local>" and "Provider" subdirectories. The <local>subdirectory includes other subdirectories (e.g., "Beef"), each containing representations of tags associated with the sensors 132 monitored and potentially controlled by the automation program 126. The Provider subdirectory includes tags associated with the other automation programs 150 made available to the tag browser 144 via the tag dictionary 148.

The tag browser 144 is designed to display tag parameters capable of being monitored or controlled by the automation program 126. For example, the tag parameters "Tagname", "Tag Type" and "Alarm Group" are displayed by the tag browser 144 in the specific case when the automation program 126 comprises the Wonderware Intouch utility. As is indicated by FIG. 3, the "Tag Type" of the highlighted tag "Fan2Motor" is seen to be "Memory Discrete". The "Fan2Motor" tag is also identified as being a member of the "Alarm Group" named "$System". The Microfiche Appendix includes a functional description and specification of other operations performed by an exemplary implementation of the tag browser 144.

Tag Sources

Each tag source is preferably represented as an instance of an ActiveX control referred to hereinafter as the DataSource control. In the preferred embodiment this control may be implemented in C, C++, Visual Basic, or any other programming language supporting COM interfaces. The DataSource control must also be capable of providing an interface which enables a user to select its tag source when the control is invoked by the tag browser 144. In an exemplary implementation such an interface comprises a dialog box of 260×160 dialog units (5850×3900 twips), assuming utilization of an MS Sans Serif 8-point font.

The DataSource control corresponding to each tag source will incorporate a number of properties and methods to facilitate interaction with the tag dictionary 148. For example, in the preferred embodiment each tag dictionary will be disposed to implement the "ItagDictionary::GetDataSource ControClsid" method described in the Reference Guide section below. Since this method returns the COM coclass Identifier ("CLSID") of the called DataSource control, each DataSource control will be designed to provide its CLSID in response to this query. Each DataSource control will also define a read/write property named "DataSource" of type BSTR. This property of the DataSource control will be used to initialize the source of tag data for each instance of the control. In a specific alternate embodiment, the automation program 126 invokes the method DataSourceValidation method (see the Microfiche Appendix) to determine the validity of the DataSource property. If the property is found to be valid, it is read by the DataSourceValidation method and persisted.

In a preferred implementation the tag browser 144 provides a dialog box through which the DataSource control corresponding to each tag source may be bound to tag dictionary 148 ("Tag Source dialog"). Upon invocation of the Tag Source dialog, the location of the tag source selected and associated with a tag dictionary 148 via a drop-down list accessible from the Tag Source dialog. The drop-down list preferably displays representations of all tag dictionaries 148 registered as in-process servers within the system environment.

Tag Filtering

In a preferred embodiment the tag browser 144 is disposed to filter the tags presented by display 110 on the basis of user-defined selection criteria. Specifically, selection criteria in the form of a regular expression serves to define a set of tags to be retrieved by the tag browser from available tag sources. In response to such a user-defined regular expression, the tag browser generates a Non-Deterministic Finite Automation ("NFA") designed to accept names of tags ("tagnames") comporting with the regular expression. This approach is believed to be unique in the sense that, for example, the NFA is generated "on-the-fly" each time the filter selection criteria (i.e., the user-defined regular expression) is modified. The tag browser 144 will preferably provide a user interface allowing entry of such regular expressions in an edit mode or the like.

The Microfiche Appendix includes source code corresponding to a preferred implementation of this filtering aspect of the tag browser 144. In the Microfiche Appendix, the file "tagfltr.h" includes a declaration of applicable class while the file "tagfltr.cpp" defines implementation of the class. As may be appreciated by reference to the Microfiche Appendix, an object of type "CTagFilter" is created in response to submission of a regular expression constituting the filter selection criteria. The CTagFilter then creates the NFA required to accept strings corresponding to the submitted regular expression. In particular, a table of "CStateTableEntry" objects representing the "triples" of the required NFA is created. Each such triple is of the form: STATE x INPUT_SYMBOL yields STATE The function "ConstructStateMachine" is called once during definition of each CTagFilter object by the code responsible for constructing such object. Similarly, the function "DestroyStateMachine" is called once in the code disposed to destroy each CTagFilter object. In this way an NFA is created on-the-fly in response to each modification of the user-defined selection criteria.

Once CTagFilterObject has created an NFA, the member function "IsAMember" may be called to initiate the filtering process. During such process the IsAMember retrieves all known tagnames and passes them through the NFA. A boolean that is true is returned by the IsAMember function if the tagname is accepted, and a false returned otherwise. The tag browser 144 then includes the tagname in the view presented by the display 110 in the case of a returned expression which is true, and otherwise excludes the tagname from view.

Reference Guide

This section describes the structure and operation of the above-referenced Intouch program available from Wonderware Corporation, through which may be implemented various aspects of the present invention.
Dictionary Description
A Tag Dictionary is a COM object that provides tags to a related application program. Therefore, the Tag Dictionary is a Tag Provider. All Tag Dictionaries have the same interface. It provides a window onto the Tag Source. In the case of tags defined by the above-referenced Intouch program, the Tag Definition source is tagname.x.
Glossary of Terms
The following table defines the acronyms used:

| | |
|---|---|
| GUID | Globally Unique Identifier |
| CLSID | COM coclass Identifier |
| IDL | Interface Definition Language |
| ODL | Object Description Language |
| BSTR | A length prefixed, UNICODE (doublewide byte) string. |
| OCX | OLE Control (ActiveX Control) |
| LCID | Local Identifier |
| ATL | ActiveX Template Library |
| Coclass | COM implementation class |
| PROGID | Programmatic Identifier. A string that maps to a CLSID. |
| Apartment | An execution context for COM objects. Refer to Microsoft Knowledge base article Q150777 for more information on COM threading models. |

Object Model
Tag Dictionary COM Object Model
Referring to FIG. 4, the Tag Dictionary Object represents a collection of Tag Definition Objects. The Tag Definition Object is has an associated Tag Type Object. The Tag Definition Object can also be a collection of other Tag Definition Objects if it is a tag collection (AKA Super Tags). The Tag Type Object is a collection of Dot Field Objects.

Architecture

Figure 5:
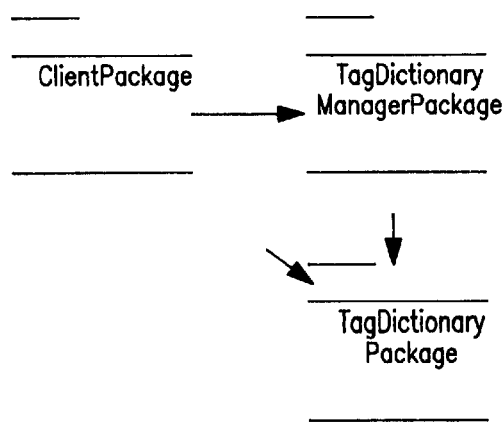
FIG. 5 illustratively represents the relationship between the components of a tool kit including software components useful in realizing a preferred implementation of the present invention.

FIG. 5 illustratively represents the relationship between the components of a tool kit including software components useful in realizing a preferred implementation of the present invention. The ClientPackage represents the client application associated with a particular container application. The ClientPackage will use the services of the TagDictionary Manager Package to select a particular tag dictionary and bind it to a tag source. The TagDictionary Manager Package also provides the services to initialize and invoke the Tag Browser. The initialization process is as follows:

1. The Client invokes the default Tag Dictionary binding it to the application's default tag source.
2. The Client invokes the Tag Browser (via the Tag Dictionary Manager Package) passing it default Tag dictionary and bound tag source and list of access names.
3. The user can pick tags and select other Tag Dictionary and associated tag sources via Tag Browser interface.

Architecture

Figure 6:
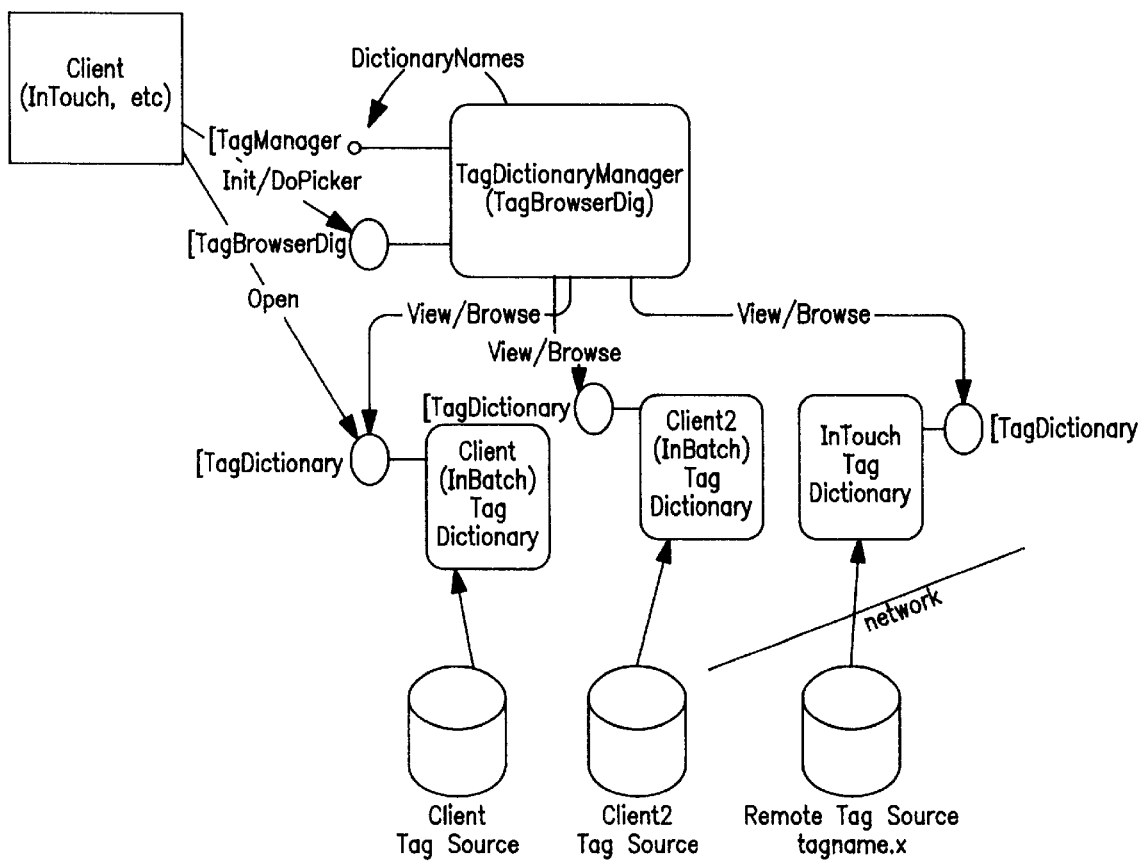
FIG. 6 illustrates certain operations and data flow characterizing a preferred implementation of a tag browser of the present invention.

FIG. 6 illustrates certain operations and data flow characterizing a preferred implementation of a Tag Browser of the present invention.

How to Develop a Tag Provider

Description

The toolkit provides the capabilities to create a template Tag Provider. A Tag Provider consists of two modules, the Tag Dictionary (an in-process server COM object) and the Tag Dictionary's DataSource ActiveX control (Data Source Control). These components are split up like this to separate the user interface functionality (the ActiveX control) from the non-user interface model (the tag dictionary). The tag dictionary manager instantiates the ActiveX control to allow the user to locate the tag data source associated with the custom dictionary. Note that the developer is only responsible to create the control, register it, and provide the CLSID (via a method on the custom tag dictionary) so that the dictionary manager may instantiate the control within the context of the manager user interface. The developer is free to establish any proprietary communications (if required) between the custom tag dictionary and the custom ActiveX control.

Important notes on the Tag Dictionary and it's DataSource Control

Each tag dictionary must implement the ITagDictionary::GetDataSourceControClsid method that returns the CLSID of an ActiveX Control. This control must be capable of providing a user interface that allows selection of a data source for the tag dictionary. This control can be implemented in C, C++, Visual Basic, or any other language that supports COM interfaces. There are only a few requirements for implementing this control:

The control must be 260-dialog units wide by 160-dialog units high (or 5850×3900 twips) assuming MS Sans Serif 8 point font.

A required read/write property named "DataSource" of type BSTR. This property will be used to initialize the controls data source upon instantiation. The control container will use the optional DataSourceValidation (see below) method to determine if the DataSource property is valid. And if the property is valid, will read the property (and persist it).

An optional method named "DataSourceValidation" with the following signature:

ODL syntax: boolean DataSourceValidation([out]long* phWnd,[out] boolean* pBIsEdit)

IDL syntax: HRESULT DataSourceValidation([out] long* phWnd, [out]VARIANT_BOOL* pBIsEdit, [out,retval] VARIANT_BOOL* pbResult);

Where the return value is VARIANT_TRUE if the DataSource property is valid, VARIANT_FALSE otherwise. The phWnd (if non-NULL) indicates a valid HWND so that the control container may set focus and the boolean pBIsEdit indicates if this HWND is an EDIT control. If it is an EDIT control, the control container will set the selection property after setting focus. If this method is not provided by the control, the control container assumes that the control is always valid. If the validation fails, then the control has two options for allowing notification of the validation failure to be presented to the user. Either the control displays a message box or the control provides an optional read-only BSTR property called LastErrorDescription (It is suggested that the control use the latter method).

Optional read-only property named "LastErrorDescription" of type BSTR. The control container, to determine the description of the validation failure (see DataSourceValidation), will query this property. This string should be a complete description of the reason for validation failure.

Optional read-write property named "LocalID" of type long. This optional property will be used by the control container to specify the local identifier (LCID). The local identifier may affect the presentation of the control and the optional read-only LastErrorDescription property.

Enumerations and Structures

WWImageType enum typedef enum tagWWImageType

```
{
    IMGTYPE_SMALL =   16,
    IMGTYPE_BIG   =   32
} WWImage Type
```

Description

Used in the ITagDictionary::GetImageList method.

Elements

IMGTYPE_SMALL

Request small images

IMGTYPE_BIG

Request large (or normal) size images

WWFilterElement structure typedef struct tagWWFilterElement

{

DWORD UniqueID;

LPOLESTR pFilterString;

OLECHAR MultiChar;

OLECHAR SingleChar;

boolean bCaseSensitive;

OLECHAR Placeholder;

DWORD Reserved;

} WWFilterElement;

Description

Used in the ITagDictionaryDelta::GetChangedIDs, ITagDictionaryDelta::GetNewIDs,

ITagDictionary::GetTagIDs, and ITagDefinition::GetMemberTagIDs methods.
Members

| | |
|---|---|
| UniqueID | The unique attribute identifier |
| pFilterString | The filter string for this UniqueID |
| MultiChar | The wildcard character used to specify multiple characters |
| SingleChar | The wildcard character used to specify a single character |
| bCaseSensitive | Determines whether the given filter criteria should be case sensitive. TRUE==case sensitive, FALSE otherwise |
| Placeholder | Determines which character within the WWFilterSpecification's expression should be replaced by the boolean value associated with this attribute and filter string |
| Reserved | This field is reserved for implementation details |

WWResetDelta enum
  typedef enum tagWWResetDelta
  {
  RESET_NEW_IDS=1,
  RESET_DELETED_IDS,
  RESET_ALL_IDS
  } WWResetDelta
Description
  Used in the ITagDictionaryDelta::ResetDelta method.
Elements
  RESET_NEW_IDS
  Remove all new IDs from the collection
  RESET_CHANGED_IDS
  Remove all changed IDs from the collection
  RESET_DELETED_IDS
  Remove all deleted IDs from the collection
  RESET_ALL_IDS
  Remove all IDs from all of the delta collections (similar to calling ResetDelta three times with each of the enum values listed above).
WWFilterSpecification structure
  typedef struct tagWWFilterSpecification
  {
  LPOLESTR pExpression;
  DWORD Count;
  WWFilterElement* pFilterElements;
  } WWFilterSpecification
Description
  Used in the ITagDictionary::GetTagIDs, ITagDictionaryDelta::GetChangedIDs, ITagDictionaryDelta::GetNewIDs, and ITagDefinition::GetMemberTagIDs methods.
Members

| | |
|---|---|
| pExpression | A boolean expression that describes the subset of IDs to be retrieved. It consists of the operators {&|!()} and the characters {A..Z a..z}. For ease of integration with the browser it is highly recommended that master filters be restricted to {A..Z}. Each character is replaced with the boolean value generated by the WWFilterElement associated with it and then the whole expression is evaluated to determine whether or not the ID is to be included. |
| Count | The number of WWFilterElements pointed to by pFilterElements |
| pFilterElements | A pointer to an array of Count many WWFilterElement objects |

WWAttributeID enum
  typedef enum tagWWAttributeID
  {
  ATTRIBID_FULLYQUALIFIED_NAME=0,
  ATTRIBID_HIERARCHICAL_NAME,
  ATTMIBID_TYPE,
  ATTRIBID_COMMENT,
  ATTRIBID_ALARM_GROUP,
  ATTRIBID_DDE_ACCESS_NAME,
  ATTRIBID_LOGGED,
  ATTRIBID_NESTED,
  ATTRIBID_EXPANDABLE,
  ATTRIBID_UDT_INSTANCE,
  ATTRIBID_MAX
  } WWAttributeID
Description
  May be used with the ISpecifyTagAttributes::GetAttributes method (or any other method or structure that requires an attribute ID).
Elements
  ATTRIBID_FULLYQUALIFIED_NAME
    The fully qualified name attribute. This is a required attribute and is represented by a LPOLESTR value. This attribute will have a display string.
  ATTRIBID_HIERARCHICAL_NAME
    The hierarchical name attribute. This is a required attribute and is represented by a LPOLESTR value. If no hierarchical name is available for the given attribute, then this ID should be mapped to ATTRIBID_FULLYQUALIFIED_NAME. This attribute will have a display string.
  ATTRIBID_TYPE
    Optional attribute ID for type. Its value is an LPOLESTR if this attribute is implemented. This attribute will have a display string.
  ATTRIBID_COMMENT
    Optional attribute ID for comments. Its value is an LPOLESTR if this attribute is implemented. This attribute will have a display string.
  ATTRIBID_ALARM_GROUP
    Optional attribute ID for alarm group. Its value is an LPOLESTR if this attribute is implemented. This attribute will have a display string.
  ATTRIBID_DDE_ACCESS_NAME
    Optional attribute ID for DDE access name. Its value is an LPOLESTR if this attribute is implemented. This attribute will have a display string.
  ATTRIBID_LOGGED
    Optional attribute ID for the logged command. Its value is an LPOLESTR that represents a Boolean ("1" or "0") if this attribute is implemented. This attribute does not have a display string.
  ATTRIBID_NESTED
    Required attribute ID for the nested command. Its value is an LPOLESTR that represents a Boolean ("1" or "0") if this attribute is implemented. This attribute does not have a display string.
  ATTRIBID_EXPANDABLE
    Required attribute ID for the expandable command. Its value is an LPOLESTR that represents a Boolean ("1" or "0") if this attribute is implemented. This attribute does not have a display string.
  ATTRIBID_UDT_INSTANCE Required attribute ID for a super tag. Its value is an LPOLESTR that represents a Boolean ("1" or "0") if this attribute is implemented. This attribute does not have a display string.

ATTRIBID_MAX

Represents the number of valid standard IDs. This is not a valid attribute identifier.

WWExtendedAttribute structure typedef struct tagWWExtendedAttribute
{
LPOLESTR pAttribute;
DWORD uniqueID;
} WWExtendedAttribute;

Description

Used in the ISpecifyTagAttributes::GetAttributes method.

Members

| | |
|---|---|
| pAttribute | If non-NULL represents attribute display string. If no display string is available, then this element will be NULL |
| uniqueID | The unique attribute identifiers. |

ITagDictionaryManager Interface

Defined in: TagIDL.h (TagIDL.IDL)

Description

Provides a method to retrieve an array of all tag dictionaries present on the local machine.

Based On: IUnknown

When to Use

When it is desired to enumerate all of the tag dictionaries that have been installed on the local machine.

Methods in Vtable Order

| | |
|---|---|
| QueryInterface | Standard IUnknown method |
| AddRef | Standard IUnknown method |
| Release | Standard IUnknown method |
| GetDictionaryNames | Retrieves an array of strings. The strings are formatted as a stringized GUID and a displayable dictionary name. |

ITagDictionaryManager:: GetDictionaryNames Method

HRESULT GetDictionaryNames (LPOLESTR** dictionaryNames[], long* pCount)

Description

Retrieves an array of strings. Each string has the following format:

"{xxxxxxxx-xxxx-xxxx-xxxx-xxxxxxxxxxxx}YYYYYYYY"

Where the {xxxx . . . xxx} represents the CLSID of the tag dictionary coclass in Win32 registry standard form, and YYYYYYYY represents the display name of the tag dictionary. You are guaranteed that the GUID portion of the string is exactly 38 characters long.

Parameters

| | |
|---|---|
| DictionaryNames | [out] upon success, the callee allocated array of strings |
| Pcount | [out] a pointer to long what will hold the element count (of strings in the array). This value may be zero, indicating no strings were returned |

Return Values

| | |
|---|---|
| S_OK | Returned one or more strings (*pCount>0) |
| S_FALSE | No array elements were returned, *pCount = 0 |
| E_OUTOFMEMORY | Unable to allocate memory for returned array of strings |
| E_FAIL | Indicates an exception. Additional descriptive information can be obtained by accessing the COM error object if available (see ISupportErrorInfo and Error Objects) |

Notes to Callers

Each string in the array is allocated within the dictionary via CoTaskMemAlloc (or IMalloc::Alloc). It is the responsibility of the caller to deallocate this memory using CoTasmMemFree (or IMalloc::Free).

The outbound array is allocated within the dictionary via CoTaskMemAlloc (or IMalloc::Alloc). It is the responsibility of the caller to deallocate this memory using CoTaskMemFree (or IMalloc::Free). Refer to the following examples.

Notes to Implementers

EXAMPLES

Caller:

long count=0;
LPOLESTR* pStr=0;
HRESULT hr=pTagDictionaryManager->GetDictionaryNames(&pStr,&count);
for (long i=0; i<count; i++)
{
// operate on the returned string
CoTaskMemFree(pStr[i]);
}
CoTaskMemFree(pStr);

Implementor:

const count=m_dictionaryNames.GetSize( );
if (count)
{
*pCount=count;
//alloc up the array of string pointers
LPOLESTR* pStrs=*pArray=static_cast<LPOLESTR*>(
CoTaskMemAlloc(count * sizeof(LPOLESTR)));
for (int i=0 ; i<count; i++)
{
pStrs[i]=ToWideStr::NewStr(m_dictionaryNames[i]);
}

ITagBrowserDig Interface

Defined in: TagIDL.h (TagIDL.IDL)

Description

This is the primary interface of the browser user interface. The implementation of the Tag Browser provides the mechanism of tag selection from all Tag Dictionaries supporting the ITagDictionary interface. It provides methods to initialize the dialog by providing a filename, array of access names, and a primary filter.

There is also a method to display the browser dialog along with parameters to allow customization of the user interface.

Based On: IUnknown

When to Use

Use this interface to perform tag selection UI from InTouch.

Methods in Vtable Order

| | |
|---|---|
| QueryInterface | Standard IUnknown method |
| AddRef | Standard IUnknown method |
| Release | Standard IUnknown method |
| Init | Initializes the browser by giving an ITagDictionary interface pointer and a base filter specification. Tag Browser may cache tags at this point. |
| SetAccessNames | Initialize the dialog with an array of access name strings |
| DoTagPickerUI | Invoke the dialog, hand it more initialization, and returns values |

ITagBrowserDlg::Init Method
HRESULT Init (ITagDictionary* pTagDictionary, WWFilterSpecification* pFilter)
Description
Initializes the browser by giving an ITagDictionary interface pointer and a base filter specification. Tags may be cached into the tag browser at this point, so this may be an expensive call for larger tag dictionaries.
Parameters

| | |
|---|---|
| pTagDictionary | [in] The primary interface pointer to a Tag Dictionary object. The caller is responsible for instantiating a COM object that supports this interface. |
| pFilter | [in] The client may specify an array of attribute/filter pairs with associated wildcard characters that will act as a base filter for displaying tags. Tag selection will be limited to those tags matching the filter specification described by pFilter. This argument may be NULL indicating no base filter should be applied. |

Return Values

| | |
|---|---|
| S_OK | Initialization successfully completed |
| E_UNEXPECTED | Initialization failed |
| E_FAIL | Indicates an exception. Additional descriptive information can be obtained by accessing the COM error object if available (see ISupportErrorInfo and Error Objects) |

Notes to Callers
The Init method is used to set the set of tags that will be used by the browser. To facilitate faster display time when DoTagPickerUI is called, tags may be loaded into memory at time of the call to Init. Be aware that this can be a very time consuming operation (30 seconds / 32 k tags for InTouch), and may use a significant amount of memory (16 MB/32 k tags for InTouch) so this method should only be called when necessary (tag browser will eventually be displayed).
Notes to Implementers
N/A

EXAMPLES

The following example will initialize the tag browser with a base filter that will only include tags starting with the "$" character:
ITagDictionary * pDictionary; ITagBrowserDlg * pDlg;
(create dialog and dictionay, open dictionary) . . .
WWFilterSpecification filterSpec;
WWFilterElement filter;
filter.UniqueID=ATTRIBID_HIERARCHICAL_NAME;
filter.pFilterString=L"$*";
filter.MultiChar='*';
filter.SingleChar='~';
filter.bCaseSensitive=false;
filter.Placeholder='A';
filterSpec.pExpression=L"A";
filterSpec.Count=1;
filterSpec.pFilterElements=&filter;
HRESULT hr=pDlg->Init(pDict, &filterSpec);
ITagBrowserDig:: SetAccessNames Method
HRESULT SetAccessNames (long count, LPOLESTR accessNames[])
Description
Allows the client of the browser dialog to specify an array of access name strings. It is expected that this method should be called prior to calling DoTagPickerUI.
Parameters

| | |
|---|---|
| count | [in] Number access name strings held in the array |
| accessNames | [in] An array of access name strings |

Return Values

| | |
|---|---|
| S_OK | Upon successful completion. |
| E_UNEXPECTED | Failure to initialize the access name array. |
| E_FAIL | Indicates an exception. Additional descriptive information can be obtained by accessing the COM error object if available (see ISupportErrorInfo and Error Objects) |

Notes to Callers
The access names provided with this call will be used to identify tag sources when the user creates them from within the tag browser. If no access names are supplied, the user is not allowed to create tag sources.
Notes to Implementers
N/A

EXAMPLES

The following example with set two access names, "Access1" and "Access2":
LPOLESTR accessNames[2];
BSTR access1=SysAllocString(L"Access1");
BSTR access2=SysAllocString(L"Access2");
accessNames[0]=access1;
accessNames[1]=access2;
HRESULT hr=pDlg->SenccessNames(2,accessNames);
SysFreeString(access1);
SysFreeString(access2);
ITagBrowserDlg::DoTagPickerUI Method
HRESULT DoTagPickerUI (ITagDefinition ppSelectedTag, IDotField ppSelectedDotField, LPOLESTR* pSelectedTagAccessName, LPCOLESTR initialAccessName, LPCOLESTR initialTagName, LPCOLESTR initialDotField, boolean bAllowDictionarySelection, boolean bAllowDotFieldSelectioin, boolean bAllowExpandableTagSelection, boolean bAllowTreeNavigation, boolean bAllowNoneTagSelection, LPCOLESTR title, HWND parentHWND)

Description
Invokes the tag browser user interface dialog and provides output.
Parameters

| | |
|---|---|
| ppSelectedTag | [out] interface pointer to the selected tag |
| ppSelectedDotField | [out] interface pointer to the selected dot field |
| pSelectedTagAccessName | [out] name string of the selected access name |
| initialAccessName | [in] used to initialize the dialog box (to select initial access name) |
| initialTagName | [in] used to initialize the dialog box (to select initial tag name) |
| initialDotField | [in] used to initialize the dialog box (to select initial dot field) |
| bAllowDictionarySelection | [in] TRUE to enable Tag Dictionary selection UI, FALSE otherwise |
| bAllowDotFieldSelectioin | [in] TRUE to enable dot field selection UI, FALSE otherwise |
| bAllowExpandableTagSelection | [in] TRUE to allow selection of expandable tags (tags with children) |
| bAllowTreeNavigation | [in] TRUE to allow user to navigate tree. |
| bAllowNoneTagSelection | [in] TRUE to allow user to select <none> tag. |
| title | [in] title string for the dialog box (optional and may be NULL) |
| parentHWND | [in] parent HWND (option and may be NULL, if NULL then parent window should be the desktop) |

Return Values

| | |
|---|---|
| S_OK | Upon successful completion. |
| S_FALSE | The user has press cancel, and all return values are NULL |
| E_POINTER | Upon detection of an invalid parameter (pointer) |
| E_UNEXPECTED | Failure to invoke the picker user interface |
| E_FAIL | Indicates an exception. Additional descriptive information can be obtained by accessing the COM error object if available (see ISupportErrorInfo and Error Objects) |

Notes to Callers

The input parameters may be NULL except if the initialDotFile is non-NULL, then the initialTagName must be non-NULL.

If the user has canceled the dialog, then the returned interface pointers (ppSelectedTag, ppSelectedDotField) and selected tag access name (pSelectedTagAccessName) could be NULL and still return a success code (S_FALSE).

EXAMPLES

The following is a minimal example of displaying the tag browser dialog:

```
HRESULT TestTagPicker(ITagBrowserDlg* pDlg)
{
    ITagDefinition* pTag = 0;
    IDotField* pDot = 0;
    WCHAR* pAccessName = 0;
    HRBSULT hr = pDlg->DoTagPickerUI(&pTag
                ,&pDot
                ,&pAccessName
                ,0
                ,0
                ,0
                ,true
                ,true
                ,true
                ,true
                ,true
                ,0
                ,0);
    if (SUCCEEDED(hr))
    {
        if (pTag)
            ReleaseAndNull(pTag);
        if (pDot)
            ReleaseAndNull(pDot);
        CoTaskMemFree(pAccessName);
    }
    return hr;
}
```

ISpecifyTagAttributes Interface
    Defined in: TagIDL.h (TagIDL.IDL)
Description
    Provides a method to retrieve an array of all tag attributes that a tag dictionary has knowledge of.
    Based On: Iunknown
When to Implement
    This is a required interface for the tag dictionary COM object.
When to Use

| Methods in Vtable Order | |
|---|---|
| QueryInterface | Standard IUnknown method |
| AddRef | Standard IUnknown method |
| Release | Standard IUnknown method |
| GetAttributes | Retrieves an array of structures provides the set of attributes (by unique identifiers and, if appropriate, display strings). |
| SetLCID | Allows setting the local identifier and, optionally, retrieve the old local identifiers for a tag dictionary. |
| GetLCID | Retrieves the currently installed local identifier for the tag dictionary. |

ISpecifyTagAttributes::GetAttributes Method
    HRESULT GetAttributes (WWExtendedAttributes** pArray, DWORD* pCount)
Description
    Retrieves the entire set of attributes understood by the tag dictionary.
Parameters

| | |
|---|---|
| pArray | [out] upon success, will return a callee allocated array of structures. Refer to WWExtendedAttributes |
| pCount | [out] the number of string elements (this value might be zero) |

Return Values

| | |
|---|---|
| S_OK | Indicates success (with at one or more returned structs, i.e., *pCount>0). |
| S_FALSE | Indicates success (with no returned structs, i.e., *pCount==0) |
| E_UNEXPECTED | A data source in not open. You must first call the Open method. |

-continued

| | |
|---|---|
| E_FAIL | Indicates an exception. Additional descriptive information can be obtained by accessing the COM error object if available (see ISupportErrorInfo and Error Objects) |
| E_OUTOFMEMORY | Implementation cannot allocate enough memory for the array of strings. |

Notes to Callers

The attribute structs obtained from this method represent the set of filterable values.

Each string in the array is allocated within the dictionary via CoTaskMemAlloc (or IMalloc::Alloc). It is the responsibility of the caller to deallocate this memory using CoTasmMemFree (or IMalloc::Free).

The outbound array is allocated within the dictionary via CoTaskMemAlloc (or IMalloc::Alloc). It is the responsibility of the caller to deallocate this memory using CoTaskMemFree (or IMalloc::Free). Refer to the following examples.

Notes to Implementers

The InTouch Tag Dictionary currently implements the following access names:

"Fully Qualified Name"

"Hierarchical Name"

"Type"

"Comment"

"Alarm Group"

"DDE Access Name"

The first two attributes are required. It is suggested (but not required) that you provide the rest of these displayable attributes.

In addition to these displayable attributes, there are some non-displayable attributes:

LOGGED

NESTED

EXPANDABLE

These non-displayable attributes represent Boolean values. The value strings associated with these are "1" for true and "0" for false. The NESTED and EXPANDABLE attributes are required. The LOGGED attribute is optional.

Tag Dictionary implementers may add additional attributes, but the existing filtering mechanism will not provide a means to filter them.

EXAMPLES

ISpecifyTagAttributes::SetLCID Method

HRESULT SetLCID (LCID localID, LCID* pOldlocalID)

Description

Allows the caller to specify a new local identifier so that returned display strings from the tag dictionary (via ITagDefinition::GetAttributeValue and the GetAttributes methods) will return localized strings. The default local ID is US English (LCID == 0x409).

Parameters

| | |
|---|---|
| localID | [in] specifies a new local identifier. |
| pOldlocalID | [out] the previous local identifier. This parameter is optional and may be NULL |

Return Values

| | |
|---|---|
| S_OK | Indicates success (the new local has been accepted). |
| S_FALSE | Indicates failure to accept (the tag dictionary does not support this local id) |
| E_FAIL | Indicates an exception. Additional descriptive information can be obtained by accessing the COM error object if available (see ISupportErrorInfo and Error Objects) |

Notes to Implementers

All string resources must be converted to the local specified if S_OK is returned.

EXAMPLES

ISpecifyTagAttributes::GetLCID Method

HRESULT GetLCID (LCID* plocalID)

Description

Allows the caller to retrieve the currently installed local identifer. The default local is U.S. English (LCID == 0x409).

Parameters plocalID [out] the currently installed LCID for the tag dictionary

Return Values

| | |
|---|---|
| S_OK | Indicates success (the new local has been accepted). |
| E_POINTER | Invalid pointer parameter. |
| E_FAIL | Indicates an exception. Additional descriptive information can be obtained by accessing the COM error object if available (see ISupportErrorInfo and Error Objects) |

ITagDictionary Interface

Defined in: TagIDL.h (TagIDL.IDL)

Description

This is the default tag dictionary interface. All tag dictionaries must support this, though they may derive from this interface in support of custom methods.

Based On: IUnknown

When to Implement

This is a required interface for all tag dictionaries.

Methods in Vtable Order

| | |
|---|---|
| QueryInterface | Standard IUnknown method |
| AddRef | Standard IUnknown method |
| Release | Standard IUnknown method |
| Open | Initializes the dictionary COM object by giving it a data source string |
| Close | Requests that the dictionary close connections to its data source |
| GetDisplayName | Called by a UI component to get a string that will be displayed to the user of this tag dictionary implementation. |
| GetDataSourceControlClsid | Called by a UI component to get the CLSID of an ActiveX control that can be used to find one of the dictionary's data sources. |
| GetImageList | Called by a UI component to retrieve an ImageList control. This image list should contain bitmaps or icons that will be displayed to the user. These images are used for the dictionary object itself and all of the tags that this dictionary implementation supports. |
| GetImageIndex | Called by the UI component to retrieve the default index (into the ImageList, see GetImageList method), and the optional selected index for the bitmap or icon for this dictionary implementation. To find the |

-continued

| | |
|---|---|
| | image index for a tag, refer to ITagType::GetImageIndex. |
| GetTagFromID | Given a unique tag identifier, will answer with an ITagDefintion pointer. |
| GetTagTypeEnum | Supplies a pointer to an enumerator that can enumerate the dictionary tag types |
| GetTagIDs | Retrieves an array of unique tag identifiers. The returned set of identifiers may be effected by the filter parameter. |

ITagDictionary::Open Method
    HRESULT Open (LPCOLESTR pDataSource)
Description
    Initializes the dictionary COM object by giving it a data source string.
Parameters
    pDataSource [in] a NULL terminated Unicode character string specifying the location of the dictionary's data source. The format and/or structure of this string may be unique for each dictionary implementation.
Return Values

| | |
|---|---|
| S_OK | Indicates success. |
| E_UNEXPECTED | A data source is already open, you must first call Close. |
| E_FAIL | Indicates failure to locate or open the data source. Additional descriptive information can be obtained by accessing the COM error object if available (see ISupportErrorInfo and Error Objects) |

Notes to Callers
    This method must be called prior to calling the following methods: GetTagFromID, GetTagTypeEnum, GetAttributes, ITagDictionaryDelta:GetChangedTags, ITagDictionaryDelta:GetNewTags, ITagDictionaryDelta:GetDeletedTags, and GetTagIDs.

EXAMPLES

STDMETHODIMP CTD::Open( LPCOLESTR name)
{
AFX_MANAGE_STATE(AfxGetStaticModuleState( ) )
USES_CONVERSION;
if (m_hFile !=INVALID_HANDLE_VALUE)
return E_UNEXPECTED;
m_hFile=CreateFile( W2T(name), GENERIC_READ,
0,0,OPEN_ALWAYS,FILE_ATTRIBUTE_NORMAL,
    0);
return (m_hFile == INVALID_HANDLE_VALUE) ?
    E_FAIL:S_OK;
}
ITagDictionary::Close Method
    HRESULT Close ( )
Description
    Request that the tag dictionary close the connection to its data source.
Parameters
    None Return Values

| | |
|---|---|
| S_OK | Indicates success. |
| S_FALSE | Indicates that there is no opened data source |
| E_FAIL | Indicates an exception. Additional descriptive information can be obtained by accessing the COM error object if available (see ISupportErrorInfo and Error Objects) |

EXAMPLES

STDMETHODIMP CTD::Close ( )
{
AFX_MANAGE_STATE(AfxGetStaticModuleState( ) )
if (m_hFile !=INVALID_HANDLE_VALUE)
return S_FALSE;
CloseHandle(m_hFile);
m_hFile=INVALID_HANDLE_VALUE;
return S_OK;
}
ITagDictionary::GetDisplayName Method
    HRESULT GetDisplayName (LPOLESTR* ppDisplayName)
Description
    User interface clients will call this to obtain a string that is descriptive of this tag dictionary COM object. This string is displayed to the user.
Parameters
    ppDisplayName [out] address of a valid LPOLESTR to retrieve the display name for this tag dictionary. This name will be shown to the user.
Return Values

| | |
|---|---|
| S_OK | Indicates success. |
| E_POINTER | Invalid pointer parameter |
| E_OUTOFMEMORY | The dictionary is unable to allocate memory for the display string |
| E_FAIL | Indicates an exception. Additional descriptive information can be obtained by accessing the COM error object if available (see ISupportErrorInfo and Error Objects) |

Notes to Callers
    The dictionary, via the shared memory allocator CoTasmMemAlloc (or IMalloc::Alloc), allocates the string. It is the responsibility of the caller to deallocate this memory using CoTaskMemFree (or IMalloc::Free).

EXAMPLES

Caller:
LPOLESTR pname=0;
HRESULT hr=pTagDictionary->GetDispalyName
    (&pname);
if (SUCCEEDED(hr))
{
//use the name here
CoTaskMemFreepname); //make sure to free the memory
}
Implementor:
STDMETHODIMP CTD:: GetDispalyName
    (LPOLESTR* ppName)
{

```
AFX_MANAGE_STATE( AfxGetStaticModuleState( )
    )
if( !ppName)
return E_POINTER;
//allocate memory for output string
*ppnaame=static_cast<LPOLESTR>(
    CoTaskMemAlloc(
(wcslen(m_pName) +1) * sizeof(WCHAR))),
if(!*ppName )
return E_OUTOFMEMORY;
wcscpy(*ppName, m_pName);
return S_OK;
}
```

ITagDictionary::GetDataSourceControlClsid Method
   HRESULT GetDataSourceControlClsid(GUID* pClsid)
Description
   User interface clients will request the dictionary's UI component through this method. The dictionary will provide the CLSID of an ActiveX control that knows how to find one of the dictionary's data sources. Refer to the topic "Writing a Dictionary ActiveX Control" for more details.
Parameters
   pClsid [out] a valid pointer to a CLSID.
Return Values

| | |
|---|---|
| S_OK | Indicates success. |
| E_POINTER | Invalid pointer parameter |
| E_FAIL | Indicates an exception. Additional descriptive information can be obtained by accessing the COM error object if available (see ISupportErrorInfo and Error Objects) |

Notes to Callers
   Use the provided CLSID to instantiate the dictionary's UI control to allow the user to navigate to one of the dictionary's data sources.
Notes to Implementers
   You may use the OLE library API CLSIDFromProgID to convert a PROGID to CLSID if you wish, but do not return the HRESULT of this API call. Only return the HRESULTs defined above.

EXAMPLES

Two methods are presented. One uses a PROGID and the other uses the CLSID:

```
STDMETHODIMP CTD::GetDataSourceControlClsid
    (GUID* pClsid)
{
AFX_MANAGE_STATE(AfxGetStaticModuleState( ) )
USES_CONVERSION;
if( ! pClsid)
return E_POINTER;
*pClsid=CLSID_NULL; //init outbound param
CString str;
str.LoadString(IDS_CONTROL_PROGID);
HRESULT hr=CLSIDFromProgID( T2W(str), pClsid);
return SUCCEEDED(hr) ? S_OK:E_FAIL;
}
STDMETHODIMP CTD::GetDataSourceControlClsid
    (GUID* pClsid)
{
AFX_MANAGE_STATE(AfGetStaticModuleState( ) )
if ( ! pClsid )
return E_POINTER;
*pClsid=CLSID_MySpecialControl;
return S_OK,
}
```

ITagDictionary::GetImageList Method
   HRESULT GetImageList (WWImageType imgType, IStream* pStream)
Description
   User interface clients will call this method to obtain an IMAGELIST control from the tag dictionary object. This IMAGELIST will contain bitmaps or icons that can be used to display to the user.
Parameters

| | |
|---|---|
| imgType | [in] requested image size. |
| pStream | [in] caller supplied IStream pointer (used to stream the IMAGELIST control) |

Return Values

| | |
|---|---|
| S_OK | Indicates success (returns the specified image size). |
| S_FALSE | Indicates success (returns the default image size, not the one requested) |
| E_POINTER | Invalid pointer parameter |
| E_FAIL | Indicates an exception. Additional descriptive information can be obtained by accessing the COM error object if available (see ISupportErrorInfo and Error Objects) |

Notes to Callers
   You are responsible to creating an IStream. This may be done in-memory (see the examples below). Be sure to use IStream::Seek to reset the stream pointer to the beginning of the stream prior to reading it's output (via ImageList_Read). Ownership of this stream interface is not given to the tag dictionary by this call.
Notes to Implementers
   You may use the IMAGELIST common control macros to create and manage the IMAGELIST via calls to ImageList_LoadBitnap( ) or ImageList_Create( ). If using ImageList_LoadBitmap, then you must specify the color used to indicate transparency. Use ImageList_Write to stream out the results to the caller. You are free to destroy the IMAGELIST control after the call to ImageList_Write.

EXAMPLES

Caller:
```
IStream* pStream=0;
HRESULT hr=CreateStreamOnHGlobal(0,TRUE,
    &pStream);
if (SUCCEEDED(hr))
{
hr=pTagDictionary->GetImageList(IMGTYPE_
    SMALL,pStream);
if (SUCCEEDED(hr))
{
//make sure to seek the stream to the beginning
LARGE_INTEGER Lint;
ZeroMemory(&Lint,sizeof(Lint));
pStream->Seek(Lint,0,0);
```

```
HIMAGELIST hImg=ImageList_Read(pStream);
//now you can attach the imagelist to CImageList . . .
}
pStream->Release( );
}
Implementor:
STDMETHODIMP      CTD::GetImageList
   (WWImageType imgtype, IStream* pstream)
{
AFX_MANAGE_STATE(AfGetStaticModuleState( ))
if (! pstream)
return E_POINTER;
HIMAGELIST hImg;
if (imgType == IMGTYPE_SMALL)
{
HImg=ImageList_LoadBitmap(_
   Module.GetResourceInstance( ),
MAKEINTRESOURCE(IDB_TAGSMALL),
IMGTYPE_SMALL,0,RGB(255,255,255));
}else{
{
//similar loading of large images
}
if (hImg)
{
hr=ImageList_Write(hImg,pStrean) ? S_OK:E_FAIL;
ImageList_Destroy(hImg);
}
return hr;
}
```

ITagDictionary::GetImageIndex Method
 HRESULT GetImageIndex (long* pdefImgIndx, long* pSelImgIndx)
Description
 This will allow the caller to find the index into the IMAGELIST control (returned from the call to GetImageList) that identifies the image(s) for this tag dictionary.
Parameters
 pDefImgIndx [out] the index into the IMAGELIST control provided through the GetImageList method. This is the default image for use in the user interface for this tag dictionary.
 pSelImgIndx [out] the optional selected image index (caller may pass a NULL).
Return Values

| | |
|---|---|
| S_OK | Indicates success. |
| E_POINTER | Invalid pDefImgIndx pointer passed to the method. |
| E_FAIL | Indicates an exception. Additional descriptive information can be obtained by accessing the COM error object if available (see ISupportErrorInfo and Error Objects) |

Notes to Implementers
 Make sure that you test pSelImgIndx for NULL prior to use. It is an optional parameter.

EXAMPLES

```
STDMETHODIMP CTD::GetImageIndex (long* pDefImgIndx, long* pSelImgIndx)
{
AFX_MANAGE_STATE(AfxGetStaticModuleState( ))
if (! pDefImgIndx)
return E_POINTER;
*pDefImgIndx=22; //index for the bitmap representation
   of this object
//this param is optional and might be NULL
if (pSelImgIndx)
*pselImgIndx=1;
return S_OK;
}
```

ITagDictionary::GetTagFromID Method
 HRESULT GetTagFromID (DWORD id, ITagDefinition** ppTag)
Description
 Used to retrieve an interface pointer to an object that implements an ITagDefinition interface given the tags unique identifier.
Parameters

| | |
|---|---|
| id | [in] unique tag definition identifier. |
| ppTag | [out] upon success will return a ITagDefinition interface pointer |

Return Values

| | |
|---|---|
| S_OK | Indicates success. |
| E_UNEXPECTED | A data source in not open. You must first call the Open method. |
| E_FAIL | Indicates an exception. Additional descriptive information can be obtained by accessing the COM error object if available (see ISupportErrorInfo and Error Objects) |
| WWTD_E_TAGID | The unique tag identifier is invalid |

Notes to Callers
 You are responsible for calling Release on the provided ITagDefintion pointer.
Notes to Implementers
 Filtering (if any) should not effect this method. Return any ITagDefinition for a valid ID irrespective of an installed filter.

EXAMPLES

Caller:
```
ITagDefnition* pTag=0;
HRESULT hr=pTagDictionary->GetTagFromID
   (uniqueID, &pTag);
if (SUCCEEDED(hr))
{
//use the pTag pointer to manipulate the Tag COM object
//be sure to call Release when done
pTag->Release( );
}
```
Implementor:
ITagDictionary::GetTagTypeEnum Method
 HRESULT GetTagTypeEnum (IEnumTagTypes** ppEnum)
Parameters
 ppEnum [out] upon success, will return a IEnumTagType interface pointer.

Return Values

| | |
|---|---|
| S_OK | Indicates success. |
| E_UNEXPECTED | A data source in not open. You must first call the Open method. |
| E_FAIL | Indicates an exception. Additional descriptive information can be obtained by accessing the COM error object if available (see ISupportErrorInfo and Error Objects) |

Notes to Callers

The enumerator should be considered a snapshot of the collection. You are responsible for calling Release on the provided IEnumTagType pointer.
ITagDictionary::GetTagIDs Method
    HRESULT GetTagIDs(WWFilterSpecification* pFilter, DWORD** ppIDs, DWORD *pdwCount);
Description
    Retrieves the set of unique tag identifiers. The pfilter parameter can limit the resultant set.
Parameters

| | |
|---|---|
| pFilter | [in] a filter specification used to limit the resulting tag identifiers. |
| ppIDs | [out] upon success, will return a callee allocated array of unique tag identifiers. |
| pdwCount | [out] the number of tag identifiers. |

Return Values

| | |
|---|---|
| S_OK | Indicates success (with at one or more returned IDs, i.e., *pCount > 0). |
| S_FALSE | Indicates success (but no returned IDs: *pCount == 0) |
| E_UNEXPECTED | A data source is not open. You must first call the Open method. |
| E_INVALIDARG | Indicates that invalid arguments were used. |
| E_FAIL | Indicates an exception. Additional descriptive information can be obtained by accessing the COM error object if available (see ISupportErrorInfo and Error Objects) |
| E_OUTOFMEMORY | Implementation cannot allocate enough memory for the array of DWORDs. |
| E_POINTER | Invalid pointer passed to method. |

Notes to Callers

The outbound array of DWORDs is allocated within the dictionary via CoTaskMemAlloc (or IMalloc::Alloc). It is the responsibility of the caller to deallocate this memory using CoTaskMemFree.
ITagDictionaryDelta Interface
    Defined in: TagIDL.h (TagIDL.IDL)
Description
    This is an optional tag dictionary interface. Tag dictionaries that wish to provide a client with a means to track incremental changes to tags should implement this interface.
    Based On: IUnknown When to Implement When the tag dictionary manages a large collection of tags then implementing this interface allows a client to optimally query the dictionary for delta changes.

When to Use

When any change is made to a tag dictionary tag collection, the client (say, the tag browser) is expected to refresh the entire collection of tags via a call to ITagDictionary::GetTagIDs followed by repeated calls to ITagDictionary::GetTagFromID to query the tag for changed information to display to the user. If the size of the tag collection were large, then it would be more efficient to query only for the delta tag changes by using this (ITagDictionaryDelta) interface.

Methods in Vtable Order

| | |
|---|---|
| QueryInterface | Standard IUnknown method |
| AddRef | Standard IUnknown method |
| Release | Standard IUnknown method |
| ResetDelta | Allows the caller to clear out any or all of the delta collections independent of retrieving the collection elements. |
| GetChangedIDs | Retrieves an array of unique tag identifiers that represent tags that have changed since the last GetTagIDs has been called. |
| GetNewIDs | Retrieves an array of unique tag identifiers that represent tags that have been created since the last GetTagIDs has been called. The filter parameter will effect the returned set of ids. |

| | |
|---|---|
| GetDeletedIDs | Retrieves an array of unique tag identifiers that represent tags that have been deleted since the last GetTagIDs has been called. The filter parameter will not effect the returned set of ids. |

ITagDictionaryDelta::ResetDelta Method
HRESULT ResetDelta(WWResetDelta enumReset);
Description
Provides a method to allow the caller to clear out any or all of the delta collections without retrieving the collection elements. This is an optional method and my return E_NOTIMPL;
Parameters
enumReset [in] specifies which delta collection (or all collections) should be cleared (see WWResetDelta)
Return Values

| | |
|---|---|
| S_OK | Indicates success. |
| E_NOTIMPL | Indicates that this method has not been implemented by the tag dictionary |

ITagDictionaryDelta::GetChangedIDs Method
HRESULT GetChangedIDs(long lFilterCount, WWFilterElementfilters[], WWFilterLogical enumLogical, boolean bReset, DWORD **ppIDs, long *plCount)
Description
Retrieves the set of unique tag identifiers that have changed since the last call to GetTagIDs or GetChangedIDs when called with bReset == TRUE.
Parameters Notes to Callers The outbound array of DWORDs is allocated within the dictionary via CoTaskMemAlloc (or IMalloc::Alloc). It is the responsibility of the caller to deallocate this memory using CoTaskMemFree (or IMalloc::Free).

Notes to Implementers

When the clients call this method, you are then required to "flush" the corresponding collection so that subsequent calls will not hand out the same IDs if the caller has specified bReset == TRUE.

ITagDictionaryDelta::GetNewIDs Method

HRESULT GetNewIDs(long lFilterCount, WWFilterElement filters[], WWFilterLogical enumLogical, boolean bReset, DWORD** ppIDs, long *plCount);

Description

Retrieves the set of unique tag identifiers that have been created since the last call to GetTagIDs or GetNewIDs when called with bReset == TRUE. The filters array effects the TagIDs returned by this method.

Parameters

| | |
|---|---|
| lFilterCount | [in] the number of WWFilterElements in the filter array |
| filters | [in] array of filters (see WWFilterElement) |
| enumLogical | [in] if FILTER_LOGICAL_NULL, then no filter is specified and lCount should be 0.<br>if FILTER_LOGICAL_AND then all filter elements are ANDed together for the query. if FILTER_LOGICAL_OR then all filter elements are ORed together for the query. |
| bReset | TRUE if the collection is to be cleared, FALSE otherwise |
| ppIDs | [out] upon success, will return a callee allocated array of unique tag identifiers. |
| plCount | [out] the number of ids. This value might be zero. |

Return Values

| | |
|---|---|
| S_OK | Indicates success (with at one or more returned IDs, i.e., *pCount > 0). |
| S_FALSE | Indicates success (with no returned IDs, i.e., *pCount == 0) |
| E_INVALIDARG | Indicates that invalid arguments were pasted. This will occur if enumLogical is set to FILTER_LOGICAL_NULL and lFilterCount is non-zero or if enumLogical is FILTER_LOGICAL_AND or FILTER_LOGICAL_OR and lFilterCount is zero. |
| E_UNEXPECTED | A data source in not open. You must first call the Open method. |
| E_FAIL | Indicates an exception. Additional descriptive information can be obtained by accessing the COM error object if available (see ISupportErrorInfo and Error Objects) |
| E_OUTOFMEMORY | Implementation cannot allocate enough memory for the array of DWORDs. |
| E_POINTER | Invalid pointer passed to method. |

| | |
|---|---|
| lFilterCount | [in] the number of WWFilterElements in the filter array |
| filters | [in] array of filters (see WWFilterElement) |
| enumLogical | [in] if FILTER_LOGICAL_NULL, then no filter is specified and lFilterCount should be 0.<br>if FILTER_LOGICAL_AND then all filter elements are ANDed together for the query. if FILTER_LOGICAL_OR then all filter elements are ORed together for the query. |
| bReset | [in] TRUE if the collection is to be cleared; FALSE otherwise |
| ppIDs | [out] upon success, will return a callee allocated array of unique tag identifiers. |
| plCount | [out] the number of ids. |

Return Values

| | |
|---|---|
| S_OK | Indicates success (with at one or more returned IDs, i.e., *pCount > 0). |
| S_FALSE | Indicates success (with no returned IDs, i.e., *pCount == 0) |
| E_INVALIDARG | Indicates that invalid arguments were pasted. This will occur if enumLogical is set to FILTER_LOGICAL_NULL and lFilterCount is non-zero or if enumLogical is FILTBR_LOGICAL_AND or FILTER_LOGICAL_OR and lFilterCount is zero. |
| E_UNEXPECTED | A data source in not open. You must first call the Open method. |
| E_FAIL | Indicates an exception. Additional descriptive information can be obtained by accessing the COM error object if available (see ISupportErrorInfo and Error Objects) |
| E_OUTOFMEMORY | Implementation cannot allocate enough memory for the array of DWORDs. |
| E_POINTER | Invalid pointer passed to method. |

Notes to Callers

The outbound array of DWORDs is allocated within the dictionary via CoTaskMemAlloc (or IMalloc::Alloc). It is the responsibility of the caller to deallocate this memory using CoTaskMemFree (or IMalloc::Free).

Notes to Implementers

You are responsible to "flush" your collection of IDs so that subsequent calls to this method do not return the same ID set if the caller has specified bReset == TRUE.

ITagDictionaryDelta::GetDeletedTags Method

HRESULT GetDeletedIDs (boolean bReset, DWORD** ppIDs, long* pCount);

Description

Retrieves the set of unique tag identifiers that have been deleted since the last call to GetTagIDs or GetDeletedIDs when called with bReset == TRUE.

Parameters

| | |
|---|---|
| bReset | [in] TRUE if the collection is to be cleared, FALSE otherwise |
| ppIDs | [out] upon success, will return a callee allocated array of unique tag identifiers. |
| pCount | [out] the number of ids. |

Return Values

| | |
|---|---|
| S_OK | Indicates success (with at one or more returned IDs, i.e., *pCount > 0). |
| S_FALSE | Indicates success (with no returned IDs, i.e., *pCount == 0) |
| E_UNEXPECTED | A data source in not open. You must first call the Open method. |
| E_FAIL | Indicates an exception. Additional descriptive information can be obtained by accessing the COM error object if available (see ISupportErrorInfo and Error Objects) |
| E_OUTOFMEMORY | Implementation cannot allocate enough memory for the array of DWORDs. |
| E_POINTER | Invalid pointer passed to method. |

Notes to Callers

The returned tag identifiers are not necessarily filtered (see ITagDictionaryFilter). This means that the caller may be returned tag identifiers that may not be allowed by the filter criteria.

The outbound array of DWORDs is allocated within the dictionary via CoTaskMemAlloc (or IMalloc::Alloc). It is the responsibility of the caller to deallocate this memory using CoTaskMemFree.

Notes to Implementers

You are responsible to "flush" your collection of IDs so that subsequent calls to this method do not return the same ID set if the caller has specified bReset == TRUE.

EXAMPLES

ItagDefinition Interface

Defined in: TagIDL.h (TagIDL.IDL)

Description

The primary interface on a tag object. Allows retrieval of attributes (such as the required attributes: hierarchical and the fuilly qualified name), tag type interface, unique identifier, and member tags if the given tag implementation is a group tag (AKA gang or User Defined Tag).

Based On: IUnknown

Methods in Vtable Order

| | |
|---|---|
| QueryInterface | Standard IUnknown method |
| AddRef | Standard IUnknown method |
| Release | Standard IUnknown method |
| GetMemberTags | Retrieves an array of unique identifiers if this tag object is a collection tag. |
| GetTagType | Returns an ITagType interface for this tag |
| GetID | Returns a unique identifier for this tag (unique within the context of a specific tag dictionary) |
| GetAttributeValue | Returns the value string for a given attribute (see ITagDictionary::GetAttritubes) |

ITagDefinition::GetMemberTagIDs Method
HRESULT GetMemberTagIDs(WWFilterSpecification* pFilter, DWORD** ppIDs, long* plCount);

Description

Returns a callee allocated array of unique tag identifiers if this tag object is a gang tag (i.e., has member tags).

Parameters

| | |
|---|---|
| pFilter | [in] A filter specification used to limit the set of tag identifiers returned |
| ppIDs | [out] callee allocated array of DWORD (unique tag identifiers) if return is S_OK |
| plCount | [out] the number of elements in the array (0 if return is S_FALSE). |

Return Values

| | |
|---|---|
| S_OK | The array of DWORD has been successfully allocated and filled with at least one entry (*pCount > 0). |
| S_FALSE | This tag is not a group tag and has no members (the array is empty and *pCount == 0) |
| E_INVALIDARG | Indicates that invalid arguments were pasted. This will occur if enumLogical is set to FILTER_LOGICAL_NULL and lCount is non-zero or if enumLogical is FILTBR_LOGICAL_AND or FILTER_LOGICAL_OR and lCount is zero. |
| E_OUTOFMEMORY | The array could not be allocated |
| E_POINTER | An invalid pointer parameter was passed into the method. |
| E_FAIL | Indicates an exception. Additional descriptive information can be obtained by accessing the COM error object if available (see ISupportErrorInfo and Error Objects) |

Notes to Callers

The outbound array of DWORDs is allocated within the implementation of this method via CoTaskMemAlloc (or IMalloc::Alloc). It is the responsibility of the caller to deallocate this memory using CoTaskMemFree.

ITagDefinition::GetTagType Method
HRESULT GetTagType (ITagType** ppTagType)

Description

Retrieves the ITagType interface pointer describing the type of this tag.

Parameters
ppTagType [out] on success, will return an interface pointer to ITagType
Return Values

| | |
|---|---|
| S_OK | Successful return of an ITagType interface pointer |
| E_POINTER | An invalid pointer parameter was passed into the method. |
| E_FAIL | Indicates an exception. Additional descriptive information can be obtained by accessing the COM error object if available (see ISupportErrorInfo and Error Objects) |

Notes to Callers
You are responsible for calling Release on the returned interface pointer
ITagDefinition:: GetID Method
HRESULT GetID (DWORD* pID)
Parameters
pID [out] on success, will return a unique identifier for this Tag (unique in the context of this tag dictionary)
Return Values

| | |
|---|---|
| S_OK | Successful return of a unique tag identifier |
| E_POINTER | An invalid pointer parameter was passed into the method. |
| E_FAIL | Indicates an exception. Additional descriptive information can be obtained by accessing the COM error object if available (see ISupportErrorInfo and Error Objects) |

ITagDefinition::GetAttributeValue Method
HRESULT GetAttributeValue (DWORD AttribID), LPOLESTR* ppAttribValue)
Description
Returns the value string for a given attribute (see ITagDictionary::GetAttritubes). There are a set of standard attributes (some are optional and some required). Refer to ISpecifyTagAttributes and the definition of WWExtendedAttribute structure. If the AttribID is not known or implemented by a particular tag object implementation, then the ppAttribValue pointer should point to a null string ("").
Parameters

| | |
|---|---|
| AttribID | [in] the unique attribute identifier (see ISpecifyTagAttributes::GetAttributes) |
| ppAttribValue | [out] on success, the value string for the given attribute. If the AttribID is not known or implemented by this tag object, then an empty string should be returned (*ppAttribValue == " ") |

Notes to Callers
You are responsible for deallocating the memory for the returned string (ppAttribValue) using CoTaskMemFree (or IMalloc::free).

Notes to Implementers
Do not return a NULL pointer for ppAttrib Value if the AttribID is not recognized. Instead, return an empty string.

IEnumTagTypes Interface

Defined in: TagIDL.h (TagIDL.IDL)

Description

Allows you to enumerate the TagTypes provided by a given Tag Dictionary implementation.

Based On: IUnknown

Methods in Vtable Order

Return Values

| | |
|---|---|
| S_OK | Successful return of a non empty value string |
| S_FALSE | The AttribID was not recognized. An empty string is returned. |
| E_POINTBR | An invalid pointer parameter was passed into the method. |
| E_FAIL | Indicates an exception. Additional descriptive information can be obtained by accessing the COM error object if available (see ISupportErrorInfo and Error Objects) |
| E_OUTOFMEMORY | unable to allocate enough memory for the output string |

| | |
|---|---|
| QueryInterface | Standard IUnknown method |
| AddRef | Standard IUnknown method |
| Release | Standard IUnknown method |
| Next | Retrieves a specified number of ITagType interfaces in the enumeration sequence. |
| Skip | Skips over a specified number of items in the enumeration sequence. |
| Reset | Resets the enumeration sequence to the beginning |
| Clone | Creates another enumerator that contains the same enumeration state as the current one. |

IEnumTagTypes::Next Method
　　HRESULT Next (ULONG celt, ITagType** rgelt, ULONG*pceltFetched)
Description
　　Retrieves the next celt items in the enumeration sequence. If there are less than the requested number of elements left in the sequence, it returns the remaining elements. The number of elements actually retrieved is returned through pceltFetched (unless the caller passed in NULL).
Parameters

| | |
|---|---|
| celt | [in] Number of elements requested |
| rgelt | [out] Array of size celt (or larger) of the elements of interest. |
| pceltFetched | [out] Pointer to the number of elements actually returned in rgelt. Caller may pass NULL if and only if celt is one. |

Return Values

| | |
|---|---|
| S_OK | Indicates that celt elements have been found and returned. |
| S_FALSE | Indicates the not all celt elements have been returned. Either the caller determines the number of elements from pceltFetched (if NULL was not passed) or if pceltFetched was set to NULL, then this indicates that no elements were returned. |
| E_FAIL | Indicates an exception. Additional descriptive information can be obtained by accessing the COM error object if available (see ISupportErrorInfo and Error Objects) |

Notes to Callers

The caller is responsible for calling Release on all returned ITagType interface pointers.

Note: the SUCCEEDED macro cannot be used to determine if you have reached the end of the enumeration sequence. S_FALSE is a success code!
Notes to Implementers
　　Be sure to AddRef all ITagType interface pointers handed out by this method call.
IEnumTagTypes::Skip Method
　　HRESULT Skip (ULONG celt)
Description
　　Skips over the next specified number of elements in the enumeration sequence.

Parameters
　　celt [in] Number of elements to be skipped
Return Values

| | |
|---|---|
| S_OK | Indicates that celt elements have been skipped. |
| S_FALSE | Indicates that the number of elements skipped is less than celt |
| E_FAIL | Indicates an exception. Additional descriptive information can be obtained by accessing the COM error object if available (see ISupportErrorInfo and Error Objects) |

Notes to Callers
　　If S_FALSE is returned, then this indicates that you have skipped to the end of the enumeration.
IEnumTagTypes::Reset Method
　　HRESULT Reset ()
Description
　　Resets the enumeration sequence to the beginning.

Return Values

| | |
|---|---|
| S_OK | The enumeration has been reset. |
| E_FAIL | Indicates an exception. Additional descriptive information can be obtained by accessing the COM error object if available (see ISupportErrorInfo and Error Objects) |

IEnumTagTypes::Clone Method
    HRESULT Clone (IEnumTagTypes** ppEnum)
Description
    Creates another enumerator that contains the same enumeration state as the current one. The new enumerator supports the same interface as the original one.
Parameters
    ppEnum [out] if successful, an interface pointer to a new enumerator with the same state as the current one.
Return Values

| | |
|---|---|
| NOERROR | if succeeded in producing the clone |
| E_POINTER | if an invalid pointer is passed in as a parameter |
| E_OUTOFMEMORY | if unable to allocate enough memory for the clone |
| E_FAIL | Indicates an exception. Additional descriptive information can be obtained by accessing the COM error object if available (see ISupportErrorInfo and Error Objects) |

Notes to Callers
    Using this method allows clients to record a cursor (with one enumerator) and continue to iterate through a collection (using another enumerator).
    Note that you are responsible for calling Release on the returned IEnumTagTypes interface pointer.
Notes to Implementers
    You are responsible for calling AddRef on the IEnumTagTypes interface pointer you hand out.
ITagType Interface
    Defined in: TagIDL.h (TagIDL.IDL)
Description
    This is the primary interface on the Tag Type object. It provides the type name, a means to enumerate the dot fields, and indices into the IMAGELIST control returned by the ITagDictionary interface (see ITagDictionary::GetImageList).
    Based On: IUnknown
Methods in Vtable Order

| | |
|---|---|
| QueryInterface | Standard IUnknown method |
| AddRef | Standard IUnknown method |
| Release | Standard IUnknown method |
| GetTypeName | Retrieves the name string of the type instance |
| GetDotFieldEnum | Retrieves a dot field enumerator allowing the caller to iterate over the dot fields |
| GetImageIndex | Retrieves the default and optional selected index into the IMAGELIST control provided by the ITagDictionary interface. |

ITagType::GetTypeName Method
    HRESULT GetTypeName (LPOLESTR* name)
Description
    Returns the name of the tag type.
Parameters
    name [out] callee allocated name string
Return Values

| | |
|---|---|
| S_OK | Successful return of name string |
| E_OUTOFMEMORY | The array could not be allocated |
| E_POINTER | An invalid pointer parameter was passed into the method. |
| E_FAIL | Indicates an exception. Additional descriptive information can be obtained by accessing the COM error object if available (see ISupportErrorInfo and Error Objects) |

Notes to Callers

The name string is allocated via the shared memory allocator CoTasmMemAlloc (or IMalloc::Alloc). It is the responsibility of the caller to deallocate this memory using CoTaskMemFree (or IMalloc::Free).

ITagType:: GetDotFieldEnum Method

HRESULT GetDotFieldEnum (IEnumDotFields** ppEnum)

Description

Returns the dot field enumerator interface.

Parameters ppEnum [out] interface pointer to a dot field enumerator.

Return Values

| | |
|---|---|
| S_OK | Successful return of enumerator interface pointer |
| E_POINTER | An invalid pointer parameter was passed into the method. |
| E_FAIL | Indicates an exception. Additional descriptive information can be obtained by accessing the COM error object if available (see ISupportErrorInfo and Error Objects) |

Notes to Callers

You are responsible for calling Release on the provided IEnumDotFields pointer.

ITagType::GetImageIndex Method

HRESULT GetImageIndex (long* pDefImgIndx, long* pSelImgIndx)

Description

This will allow the caller to find the indices into the IMAGELIST control (returned from the call to ITagDictionary::GetImageList) that identifies the image(s) for this tag type.

Parameters

| | |
|---|---|
| pDefImgIndx | [out] the index into the IMAGELIST control provided through the ITagDictionary::GetImageList method. This is the default image for use in the user interface for this tag type. |
| pSelImgIndx | [out] the optional selected image index (may be NULL). |

Return Values

| | |
|---|---|
| S_OK | Indicates success. |
| E_POINTER | Invalid parameters pass to the method. |
| E_FAIL | Indicates an exception. Additional descriptive information can be obtained by accessing the COM error object if available (see ISupportErrorInfo and Error Objects) |

IEnumDotFields Interface

Defined in: TagIDL.h (TagIDL.IDL)

Description

Allows you to enumerate the Dot Fields provided by a given Tag Dictionary implementation or Tag Definition.

Based On: IUnknown

Methods in Vtable Order

| | |
|---|---|
| QueryInterface | Standard IUnknown method |
| AddRef | Standard IUnknown method |
| Release | Standard IUnknown method |
| Next | Retrieves a specified number of IDotField interfaces in the enumeration sequence. |
| Skip | Skips over a specified number of items in the enumeration sequence. |
| Reset | Resets the enumeration sequence to the beginning |
| Clone | Creates another enumerator that contains the same enumeration state as the current one. |

IEnumDotFields::Next Method

HRESULT Next (ULONG celt, IDotField** rgelt, ULONG* pceltFetched)

Description

Retrieves the next celt items in the enumeration sequence. If there are less than the requested number of elements left in the sequence, it returns the remaining elements. The number of elements actually retrieved is returned through pceltFetched (unless the caller passed in NULL).

Parameters

| | |
|---|---|
| celt | [in] Number of elements requested |
| rgelt | [out] Array of size celt (or larger) of the elements of interest. |
| pCeltFetched | [out] Pointer to the number of elements actually returned in rgelt. Caller may pass NULL if and only if celt is one. |

Return Values

| | |
|---|---|
| S_OK | Indicates the celt elements have been found and returned. |
| S_FALSE | Indicates the not all celt elements have been returned. Either the caller determines the number of elements from pceltFetched (if NULL was not passed) or if pceltFetched was set to NULL, then this indicates that no elements were returned. |
| E_FAIL | Indicates an exception. Additional descriptive information can be obtained by accessing the COM error object if available (see ISupportErrorInfo and Error Objects) |

Notes to Callers

The caller is responsible for calling Release on all returned IDotField interface pointers.

Note: the SUCCEEDED macro cannot be used to determine if you have reached the end of the enumeration sequence. S_FALSE is a success code!

Notes to Implementers

Be sure to AddRef all IDotField interface pointers handed out by this method call.

Notes to Callers

If S_FALSE is returned, then this indicates that you have skipped to the end of the enumeration.

IEnumDotFields::Reset Method

HRESULT Reset ( )

Description

Resets the enumeration sequence to the beginning.

Return Values

| | |
|---|---|
| S_OK | The enumeration has been reset. |
| E_FAIL | Indicates an exception. Additional descriptive information can be obtained by accessing the COM error object if available (see ISupportErrorInfo and Error Objects) |

IEnumDotFields::Skip Method

HRESULT Skip (ULONG celt)

Description

Skips over the next specified number of elements in the enumeration sequence.

Parameters celt [in] Number of elements to be skipped

Return Values

| | |
|---|---|
| S_OK | Indicates that celt elements have been skipped. |
| S_FALSE | Indicates that the number of elements skipped is less than celt |
| E_FAIL | Indicates an exception. Additional descriptive information can be obtained by accessing the COM error object if available (see ISupportErrorInfo and Error Objects) |

IEnumDotFields::Clone Method

HRESULT Clone (IEnumDotFields** ppEnum)

Description

Creates another enumerator that contains the same enumeration state as the current one. The new enumerator supports the same interface as the original one.

Parameters ppEnum [out] if successful, an interface pointer to a new enumerator with the same state as the current one.

Return Values

| | |
|---|---|
| NOERROR | if succeeded in producing the clone |
| E_POINTER | if an invalid pointer is passed in as a parameter |
| E_OUTOFMEMORY | if unable to allocate enough memory for the clone |
| E_FAIL | Indicates an exception. Additional descriptive information can be obtained by accessing the COM error object if available (see ISupportErrorInfo and Error Objects) |

Notes to Callers

Using this method allows clients to record a cursor (with one enumerator) and continue to iterate through a collection (using another enumerator).

Note that you are responsible for calling Release on the returned lEnumDotFields interface pointer.

Notes to Implementers

You are responsible for calling AddRef on the IEnuml)otFields interface pointer you hand out.

EXAMPLES

IDotField Interface
   Defined in: TagIDL.h (TagIDL.IDL)
Description
   Provides the dot field name along with the name of its type.
   Based On: IUnknown
Methods in Vtable Order

| | |
|---|---|
| QueryInterface | Standard IUnknown method |
| AddRef | Standard IUnknown method |
| Release | Standard IUnknown method |
| GetName | Retrieves the name string of the dot field instance |
| GetTypeName | Retrieves the type name. |

IDotField::GetName Method
   HRESULT GetName (LPOLESTR* name)
Description
   Returns the name of the dot field.
Parameters
   name [out] callee allocated name string
Return Values

| | |
|---|---|
| S_OK | Successful return of name string |
| E_OUTOFMEMORY | The array could not be allocated |
| E_POINTER | An invalid pointer parameter was passed into the method. |
| E_FAIL | Indicates an exception. Additional descriptive information can be obtained by accessing the COM error object if available (see ISupportErrorInfo and Error Objects) |

Notes to Callers

The name string is allocated via the shared memory allocator CoTasmMemAlloc (or IMalloc::Alloc). It is the responsibility of the caller to deallocate this memory using CoTaskMemFree (or IMalloc::Free).

IDotField::GetTypeName Method
   HRESULT GetTypeName (LPOLESTR* name)
Description
   Returns the name of the dot field type.
Parameters
   name [out] callee allocated name string
Return Values

| | |
|---|---|
| S_OK | Successful return of name string |
| E_OUTOFMEMORY | The array could not be allocated |
| E_POINTER | An invalid pointer parameter was passed into the method. |
| E_FAIL | Indicates an exception. Additional descriptive information can be obtained by accessing the COM error object if available (see ISupportErrorInfo and Error Objects) |

Notes to Callers

The name string is allocated via the shared memory allocator CoTasmMemAlloc (or IMalloc::Alloc). It is the responsibility of the caller to deallocate this memory using CoTaskMemFree (or IMalloc::Free).

USE OF THE TAG BROWSER

The Tag Browser provides a tool for viewing and selecting local and remote tagnames and tagname .fields from FactorySuite applications, or any other tag source that supports the InTouch Tagname Dictionary interface. It allows selection of existing tagnames, addition of new tagnames and viewing of basic Tagname Dictionary information. The Tag Browser may also be used to access the dialog boxes that allow you to perform tagname editing, replication, and to select tagnames (remote references) in remote tag sources.

The first time the Tag Browser is accessed, <local> will be selected for the tag source by default. Meaning that the tagnames in the local application's Tagname Dictionary will be displayed. Thereafter, the last accessed tag source's tagnames will be displayed.

The Tag Browser operates in two modes; "Filtered Selection Mode" and "Unlimited Selection Mode." The mode for the Tag Browser is determined by the method you use to access it. The following lists the primary methods that you can use to access the Tag Browser in each mode:

Unlimited Selection Mode

Double-clicking an animation link tagname or expression input box.

Double-clicking an ActiveX or wizard tagname or expression input box.

Double-clicking a blank area in any InTouch QuickScript window.

In the InTouch QuickScript editor, selecting the Tagname command on the Insert menu.

Pressing the ALT+N keys in the InTouch QuickScript editor.

Double-clicking a blank New Name box in the Substitute Tagnames dialog box.

Double-clicking the Tagname.FieldName input box in the SQL Access Bind List Configuration dialog box.

Filtered Selection Mode

Clicking the Select button in the Tagname Dictionary.

When WindowMaker is running, double-clicking a cell in the Unit# column in a Recipe Manager Unit Template definition.

In runtime, clicking any Pen# button in the Historical Trend Setup dialog box. In this instance, the Tag Browser will only display the tagnames that are defined with the Log Data option selected in the Tagname Dictionary.

✒ This functionality is only supported when the Alow Runtime Changes option has been selected for the historical trend during development.

In runtime, clicking any object linked to the HTSelectTag() function.

ᔎ For more information on the Tag Browser modes, see "Tag Browser Selection Modes."

The Tag Browser's status bar provides status on the following items for the currently displayed tag source:

Total number of items in the application.

The name of the currently selected item.

Tagname field selected, if any.

The Access Name associated with the tag source.

Tag Browser Selection Modes

The Tag Browser operates in two selection modes; Filtered Selection Mode and Unlimited Selection Mode.

Filtered Selection Mode

Figure 7:
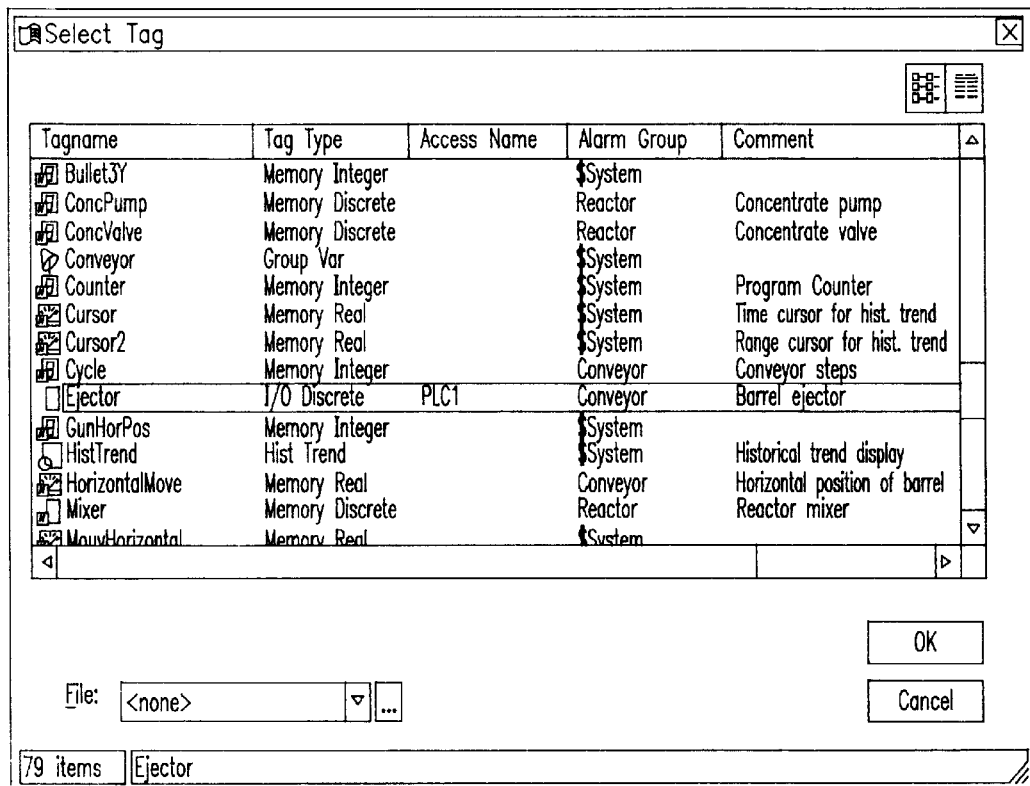
FIGS. 7–24 illustratively represent various dialog boxes and screen displays generated by the tag browser of the present invention in response to corresponding user menu selections.

As shown in FIG. 7, If you click Select in the Tagname Dictionary dialog box or, during runtime (when the operator is allowed to make runtime changes to a historical trend) when selecting a new tagname for a historical trend pen, the tagnames displayed (and available for selecting) will be limited to the current InTouch application. For example, when you access the Tag Browser from the Tagname Dictionary and you select a tagname in this view, it's Tagname Dictionary definition appears after you click OK.

Note Tagname .fields cannot be selected in this mode.

Unlimited Selection Mode

The unlimited selection mode is accessed by double-clicking in a blank area in any InTouch QuickScript window, animation link tagname or expression box or, a blank New Name box in the Substitute Tagnames dialog box. The tagnames defined in a local or remote tag source can be displayed and selected in this mode.

Figure 8:
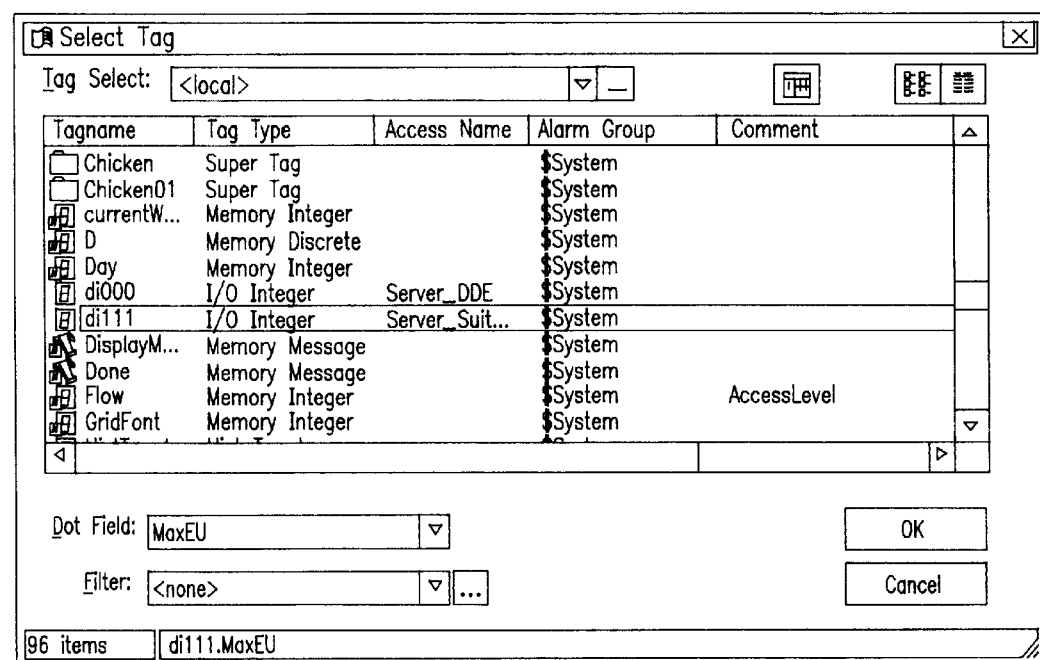

Tagname .fields can also be selected for the tagname in this mode. When you select a tagname and/or tagname .field in this mode, it is automatically entered into the InTouch QuickScript, animation link tagname or expression box or, other location from which you accessed the Tag Browser. For example and with reference to FIG. 8:

> To select a .field:

1. Click the Dot Field arrow to open the list of .fields that you can associate with the type of tagname currently selected.

✒ By default, <none> will initially be displayed for all types of tagnames.

Note Dot Field is not available when you access the Tag Browser from the Tagname Dictionary or, during runtime, when selecting a tagname for a historical trend pen from the Historical Trend Setup dialog box. (The historical trend must be configured with the Allow runtime changes option selected.)

2. Click the .field in the list that you want to append to the selected tagname.

✒ Not every tagname type has the same .fields. For example, a Discrete type tagname has .OnMessage, whereas an analog does not. If you select a Discrete type tagname and you assign .OnMessage to it, and then you select another Discrete type tagname, the displayed .field list will not change. But, if you select another type of tagname in the control view list, for example an analog, the displayed .field will revert to <none>.

Tag Browser Views

The Tag Browser supports three control views; Tagname List Control, Tagname Details Control and Tagname Tree View Control.

 List View

Figure 9:
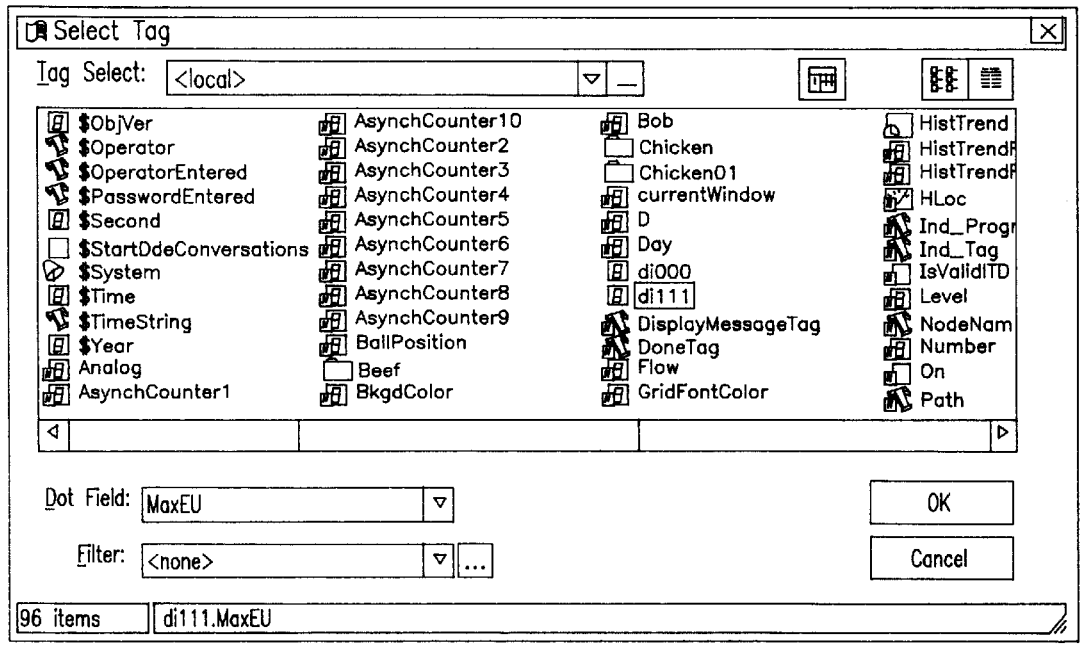

The list view is used to display and select tagnames within the current selection mode (described above). The Tagname List Control view displays the tagnames in two views depending upon the state of the List View and Details View buttons:

When you select list view, small icons will be displayed next to the tagnames with icons displayed according to the type of each tagname. No other fields will be displayed in the list view. For example and with reference to FIG. 9:

To refresh the display in the Select Tag dialog box, press F5.

 Details View

Figure 10:
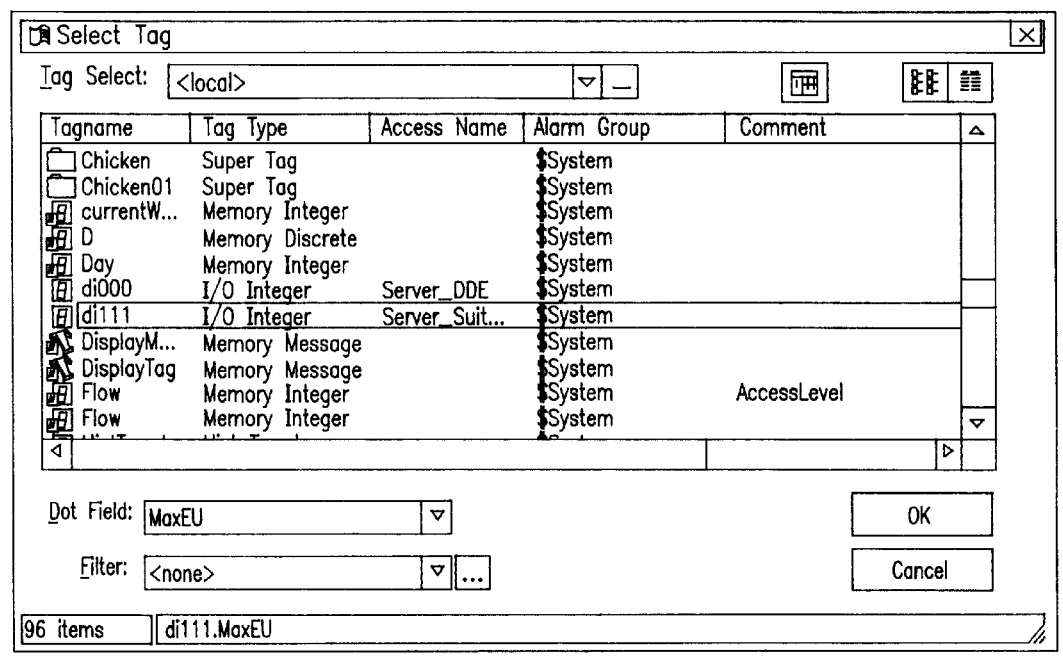

When you select details view, the tagnames and their details are displayed in a multi-column format. The details displayed are Tagname Name, Tagname Type, Access Name, Alarm Group and Comment. You can sort the list by each detail type by clicking on its column header name. An item can be selected by clicking on any portion of its display, not just the tagname. (The entire row will be highlighted.). For example and with reference to FIG. 10:

When you switch views, the selected tagname will remain visible and highlighted in the new view.

 Tree View

The Tree View displays the tagnames in two views depending upon the state of the List View and Details View buttons. When you select the tree view, a pane appears on the left side of the dialog box. By using the Tree View you can also access the member tagnames in any SuperTag template.

Figure 11:
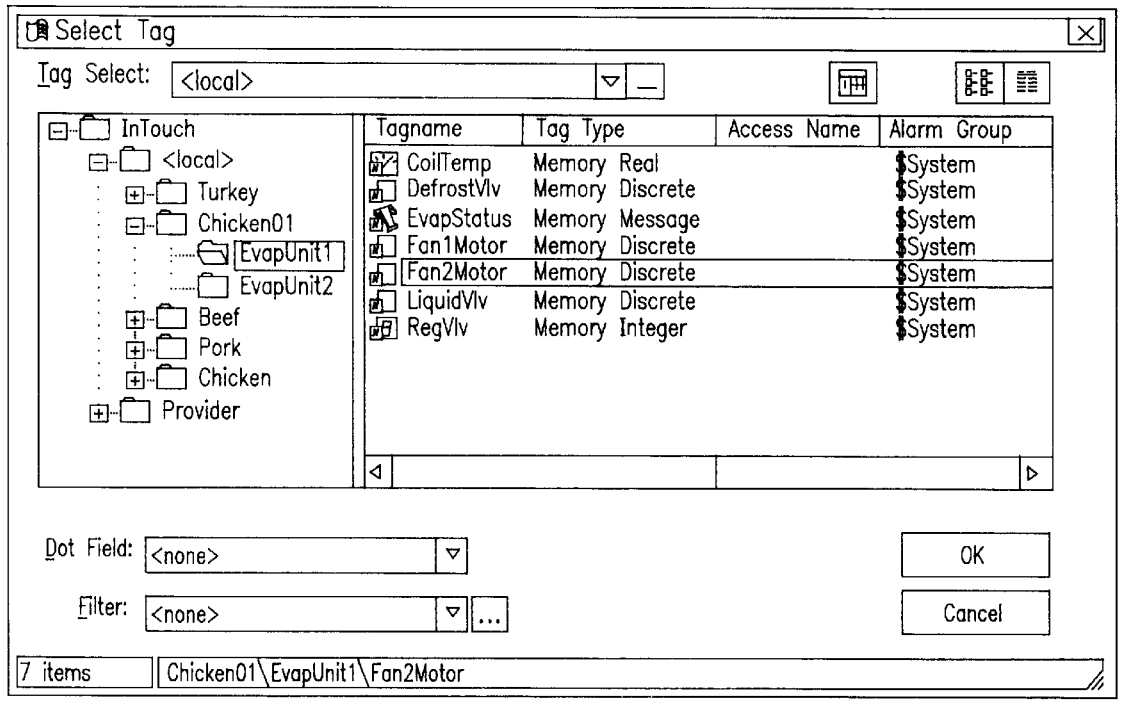

If the Details View mode is active when you select the Tree View, Tag Browser appears as indicated by FIG. 11. To expand a listing in the Tree View, double-click the application name or, click the +. To collapse a listing, double-click the application name again or, click the –. Double-clicking an application in the tree view pane is the same as selecting it in the Tag Source list.

Note When you "drill down" through different levels in the Tag Browser, you can use the BACKSPACE key to "back up" to the previous level.

Defining Tag Sources

You must define the tag sources for viewing in the Tag Browser. The procedures for adding, deleting or editing tag sources are described in this section. When you add or edit a tag source definition, you will enter information such as the local network Access Name you want to associate with the tag source's tagnames, a user-defined application name, and the data source for the tag source.

Note You will also use these procedures when you are converting placeholder tagnames to remote tagname references.

ᔎ For more information on remote tagname references, see "Converting Tagnames to Remote References."

Figure 12:
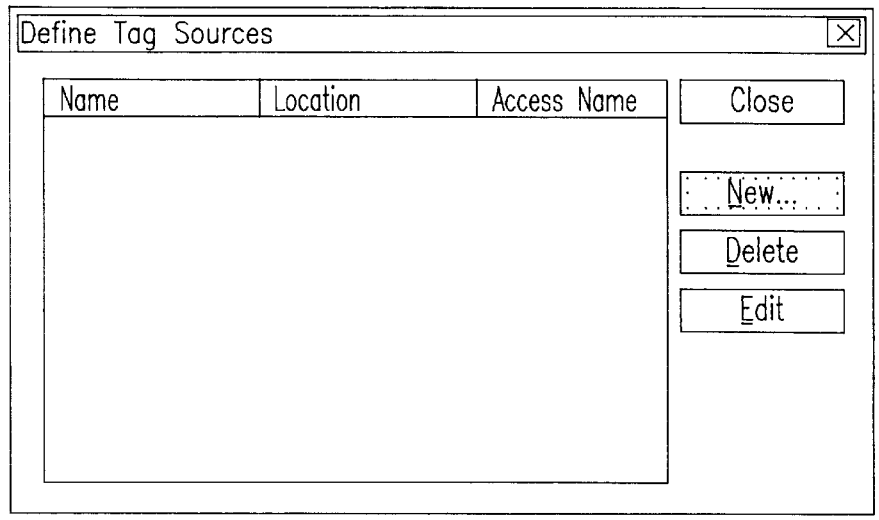

ᔎ To define a tag source:

1. Open the Tag Browser, and then click the Define Tag Sources button. The Define Tag Sources dialog depicted in FIG. 12 will appear.
Note If tag sources are already defined, they will be listed when the dialog box appears. The list will include the user-defined Name for the tag source, the Location of the tag source (path) and the local network Access Name associated with the application.

- To select multiple tag sources, hold down the SHIFT key as you click each name. To select multiple tag sources that are not consecutive in the list, hold down the CTRL key as you click each name.

Note When the Define Tag Sources dialog box closes, you must click the Tag Source arrow in the Tag Browser and select the new tag source in the list. The Tag Browser is then refreshed and tagnames for the selected tag source are displayed.

3. To remove a tag source(s) from the Tag Source list in the Tag Browser, click the Define Tag Sources button. The Define Tag Sources dialog box appears. Select the tag source in the list, and then click Delete.

4. To edit a defined tag source, select it in the list, and then click Edit. The Define Tag Source dialog box appears displaying the configuration for the selected tag source.

Figure 13:
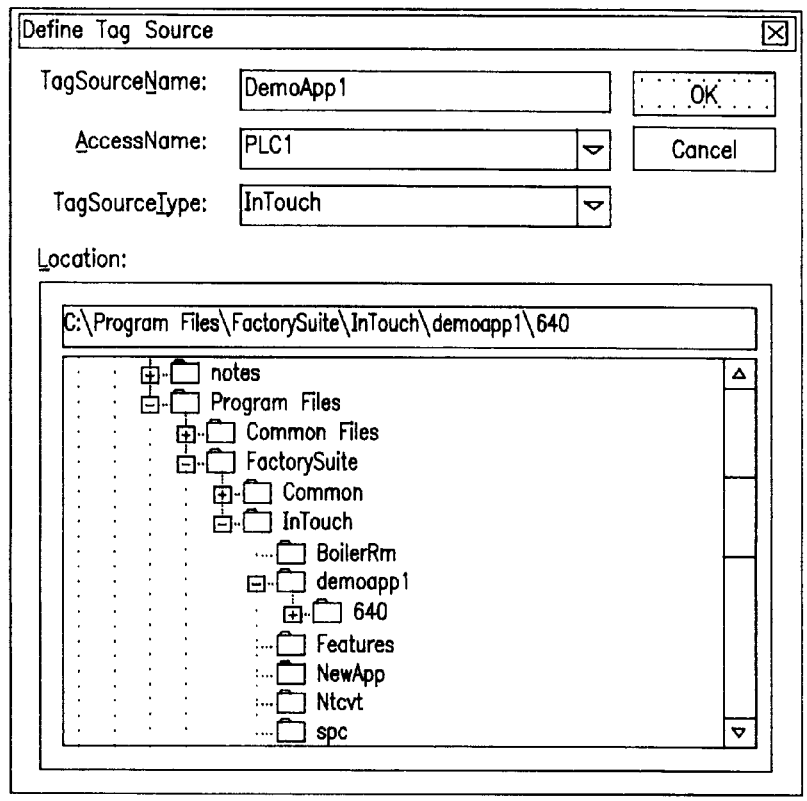

5. To define a new tag source, click New. The Define Tag Source dialog 5 box of FIG. 13 appears.
Note When you click New, if no Access Name is defined in your local application, a message box appears telling you there are no Access Names defined and you will not be allowed to define a new tag source. (Tag sources must be associated with a local network Access Name.)

6. In the Tag Source Name box, type a name to identify the tag source.

7. Click the Access Name arrow and select the Access Name in the local application that you want to associate with the tagnames in the tag source.

8. Click the Tag Source Type arrow and select the source for the tag source's tagname database. (By default, InTouch is displayed.)

9. The Location box displays the fill path to the tag source.

Figure 14:
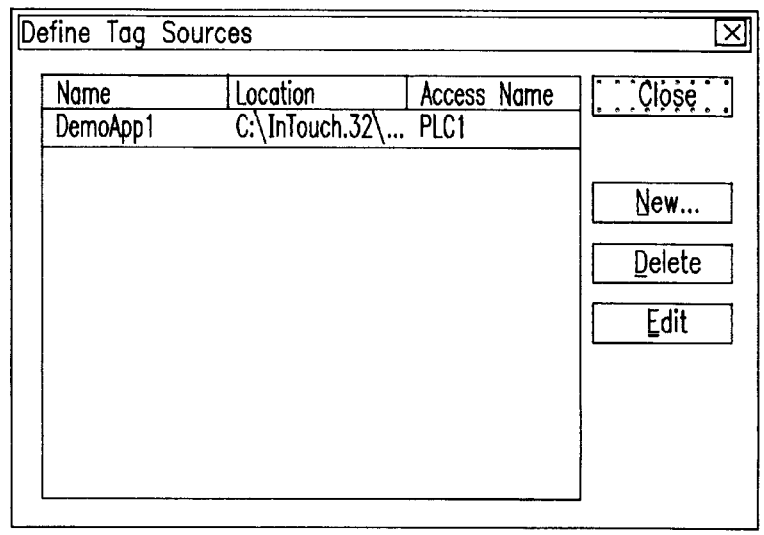

10. In the directory tree pane, locate the tag source, and then click OK. As is exemplified by FIG. 14, the Define Tag Sources dialog box reappears displaying the selected tag source:

11. Click Close. The Tag Browser reappears.

Figure 15:
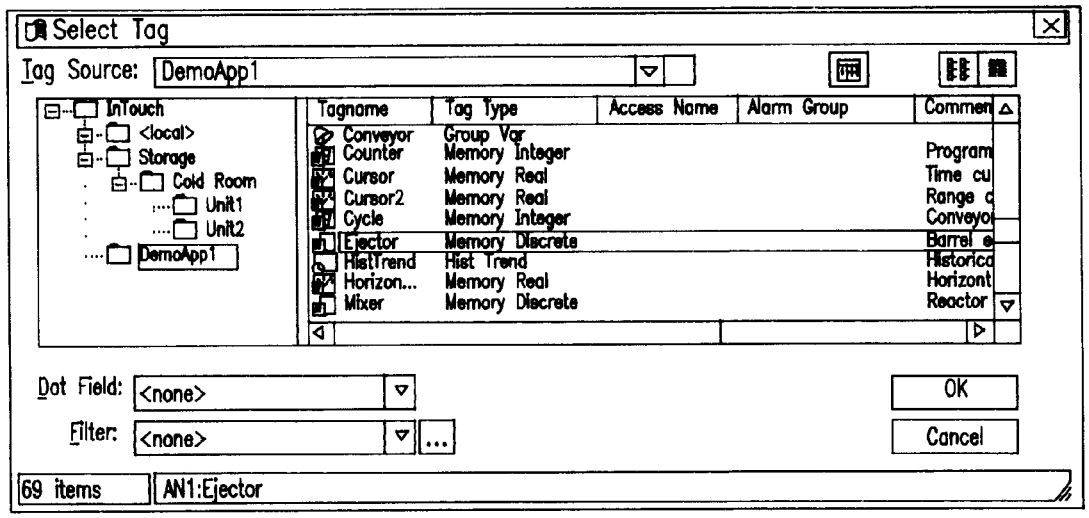

12. Click the  tool to display the tree view pane to display all defined tag sources (see, e.g., the exemplary screen display of FIG. 15):

If you are not using the tree view mode, click the Tag Source arrow and select the name for the tag source that you want to display in the list. The Tag Browser will refresh and the tag sources' tagnames will be displayed.

The first time you access the Tag Browser, by default, <local> will be selected for the Tag Source. Thereafter, the tagnames for previously accessed tag source will be displayed.

13. Click OK.

Defining Tag Browser Filters

You will use the procedures described in this section to define the filters (search criteria) you want to use to populate the Tag Browser. By creating filters, you can sort any tagname list and display only the tagnames that meet the criteria you specify. You can sort the tagnames based on Tagname, Tag Type, Access Name, Alarm Groups and tagname Comments. You can use one or a combination of any of these items to set the criteria for your display. You can also save each filter instance and reuse it at any time.

- For example, if you have 40,000 tagnames defined in your Tagname Dictionary and you only need to deal with the 20 or so that are assigned to a particular Access Name or Alarm Group, you can create a filter and specify the Access Name and/or Alarm Group as the criteria that the tagnames must meet in order to be displayed in the Tag Browser.

Figure 16:
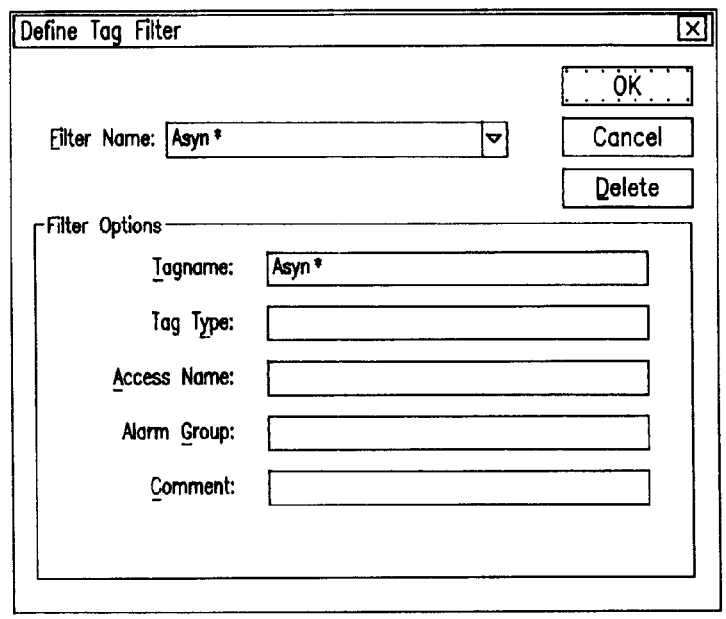

 To define a search filter:

1. Click the Define Filter button. The Define Tag Filter dialog box depicted in FIG. 16 appears. If you right click the mouse in any of the text entry boxes, a menu appears displaying the commands that you can apply to the selected text.

2. In the Filter Name box, type a unique name to identify the filter that you are defining or, click the Filter Name arrow to select a previously defined filter name from the list. (As you define filters, the Filter Name you type is added to the list.)

- All of the Filter Option controls (Tagname, Tag Type, Access Name, Alarm Group and Comment) allow you to enter a wildcard expression to limit the scope of your search. If no filter is used, all of the tagnames in the currently displayed tag source will be displayed.

The multiple wildcard is the asterisk (*). For example, "Asyn*" would search for all tagnames beginning with the character "Asyn".

The single character wildcard is the tilde (?). For example, the filter, "Tag?" would search for all four character tagnames that begin with "Tag". The filter, "Tag??", would search for all five character tagnames that begin with "Tag", and so on.

Any sequence of valid InTouch tagname characters, together with the two wildcard characters, is acceptable in a filter. The valid tagname characters are: A–Z, a–z, 0–9, !, @, -, ?, #, $, %, _, \ and &.

3. In the Tagname box, type the tagname expression that you want to use as a filter. If left blank, the system will ignore this field in the filter definition.

4. In the Access Name box, type the local Access Name expression that you want to use as a filter. If left blank, the system will ignore this field in the filter definition.

5. In the Alarm Group box, type the name of the Alarm Group expression that you want to use as a filter. If left blank, the system will ignore this field in the filter definition.

6. In the Comment box, type the comment expression you want to use as a filter. If left blank, the system will ignore this field in the filter defintion.

7. Click OK to close dialog box.

- The Filter Name will now appear in the Filter list in the Tag Browser and you can select it to display only the tagnames meeting the criteria specified in the filter.

> To delete a search filter:

1. Click the Filter arrow and select the filter name in the list that you want to delete.

2. Click Delete. The filter is immediately deleted.

CROSS REFERENCE UTILITY

The Tagname Cross Referencing utility allows you to determine your tagname, remote tagname and SuperTag usage in animation links, wizards, InTouch QuickScripts, QuickFunctions, ActiveX controls, scripts and the following InTouch add-on programs, SPC Pro, SQL Access Manager and Recipe Manager. For all objects such as wizards, ActiveX controls and animation links, it displays the window name and the coordinates of all objects linked to the tagname. It also allows you to view any QuickScript or QuickFunction where a tagname is found.

> For convenience, the Tagname Cross Reference utility can remain open in WindowMaker while you perform other tasks.

Figure 17:
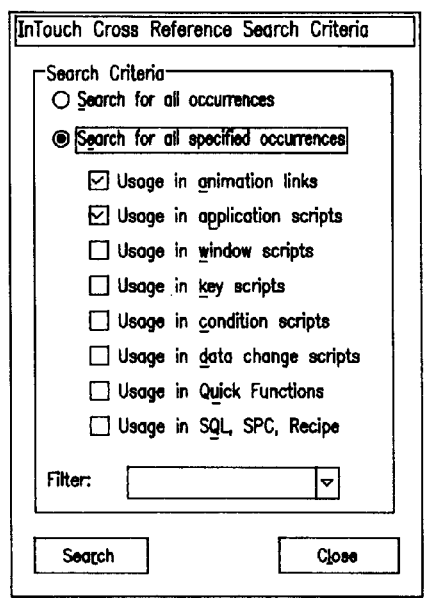

> To use the InTouch Cross Reference utility:

1. On the Special menu, click Cross Reference or, in the Application Explorer double-click Cross Reference. The InTouch Cross Reference Search Criteria dialog box appears in the form depicted in FIG. 17.

2. The Search Criteria group allows you to limit the scope of your search. You can easily determine the scope by selecting only the options required.

Search for all occurrences Search for all uses of the tagname or SuperTag in animation links, InTouch QuickScripts and all add-on programs such as SPC, SQL Access Manager, Recipe Manager, and so on.

Search for specific occurrences Search for only the tagname or SuperTag only in the specified options. For example, if you only want to search for the usage in window scripts, only select Usage in window scripts.

TAG BROWSER FUNCTIONALITY

1. Overview

The Tag Browser presented here is designed to allow selection of tags from all supporting third party applications.

2. Dialogs 2.1 Tag Browser

Figure 18:
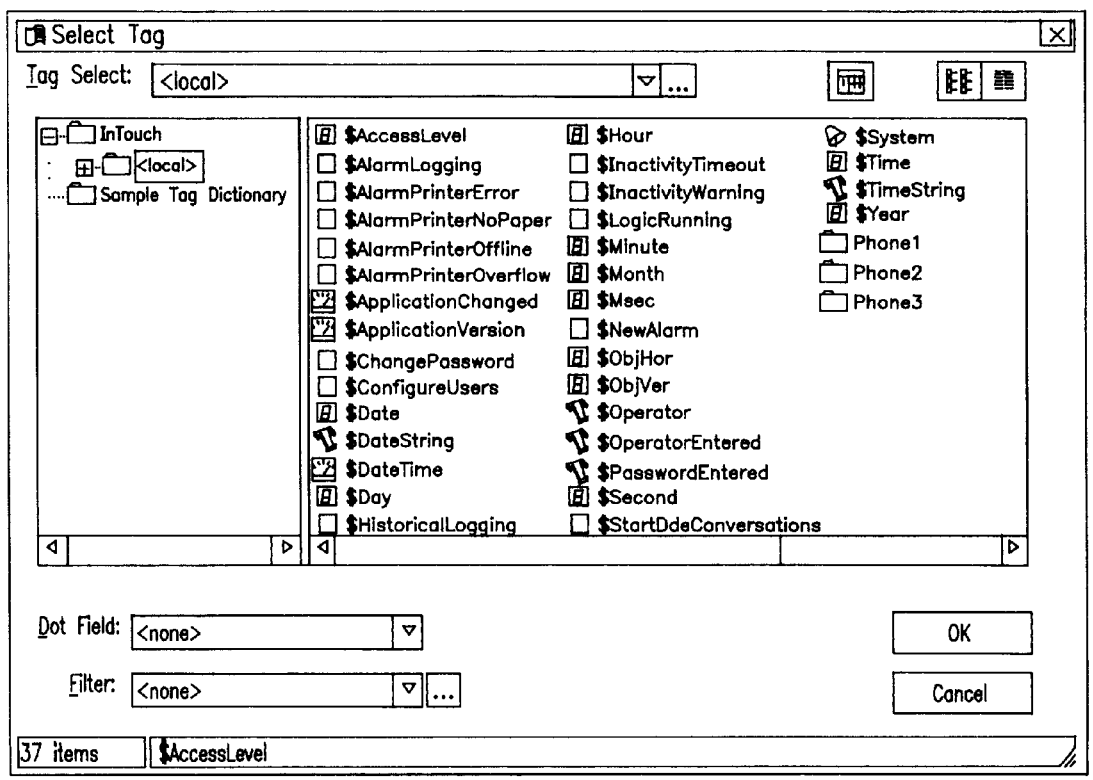

Referring to FIG. 18, the Tag Browser dialog is used for selecting tags and dot fields from FactorySuite applications, or any other tag source that supports the Tag Dictionary interfaces.

2.1.1 Modes 2.1.1.1 Limited Selection to Current Tag Source

If the Tag Browser is launched from the InTouch Tag Dictionary dialog using the "Select" button, the tags displayed and available for picking will be limited to the current InTouch application. This will keep the user from selecting tags from other tag sources that cannot be handled within the InTouch Tag Dictionary dialog.

2.1.1.2 Unlimited Selection

If the Tag Browser is launched from the script editor, or an animation link, or any other location where remote tags can be selected, tags from any configured tag source will be displayed and available for selection.

2.1.1.3 Allow Dot Field selection

The Tag Browser can be set to allow or disallow dot field selection. When launched from the Tag Dictionary dialog, dot field selection is not allowed, when launched from a script for tag selection, dot fields can be selected. No dot fields will be displayed if dot field selection is not allowed.

2.1.1.4 Allow Super Tag Selection

Figure 19:
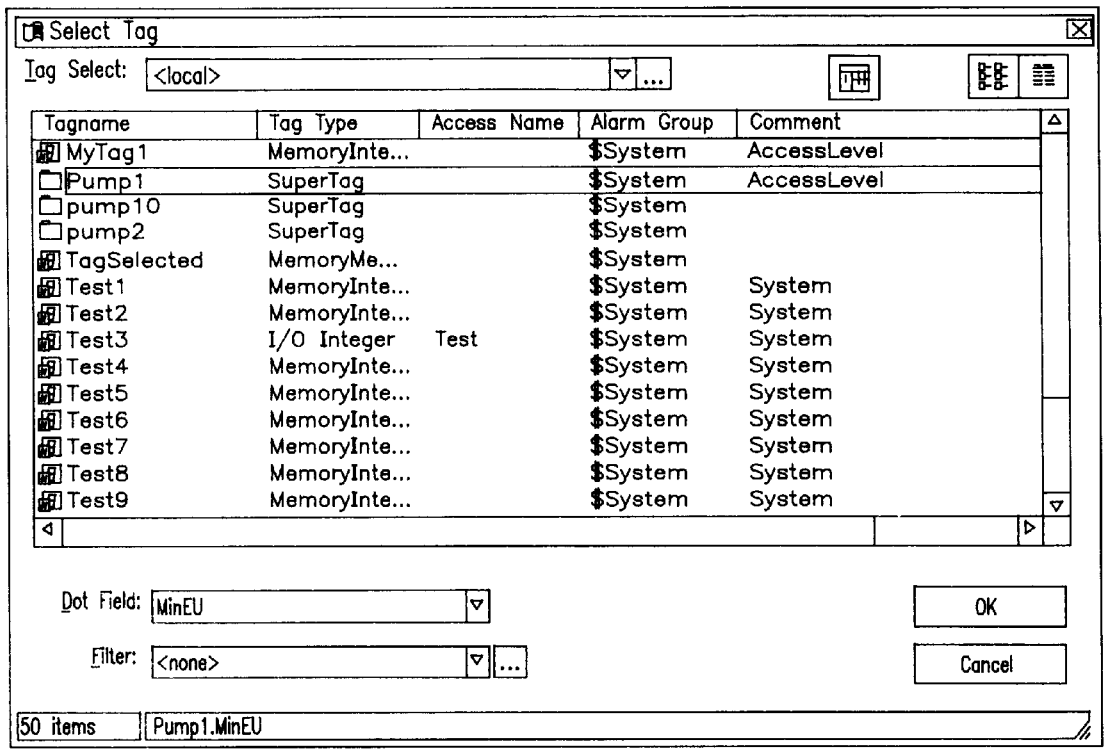
Figure 20:
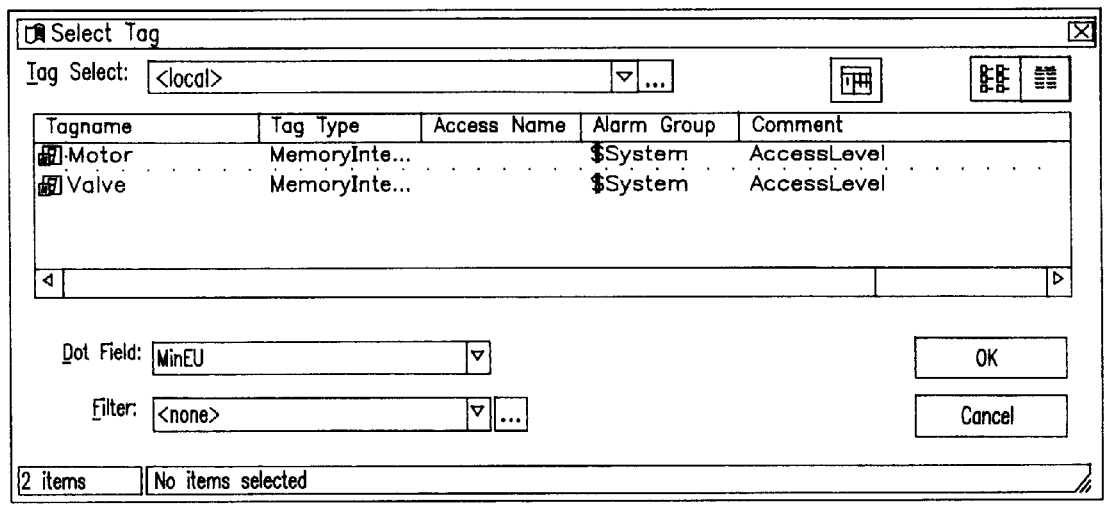
Figure 21:
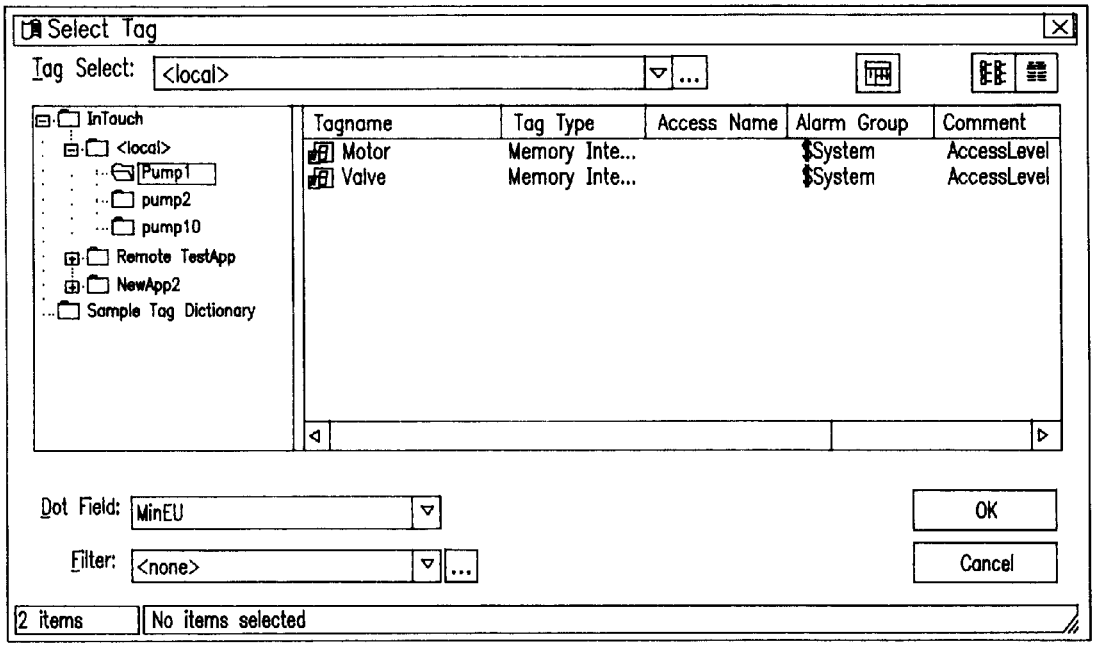

Referring to FIG. 19, the Tag Browser can be set to allow or disallow selection of tags that contain other tags (SuperTags). When launched from the Tag Dictionary dialog, SuperTags can be selected, but when launched for script or animation link tag selection, only SuperTags member data can be selected. One can select a SuperTag member from the list view by drilling down through the SuperTag as in FIGS. 19 and 20. Alternately, one can select the SuperTag through the Tree View and the select the member data in the list view as in FIG. 21.

2.1.1.5 Allow None tag selection

The Tag Browser can be set to allow or disallow selection of zero tags. In normal operation, the user must select a tag before hitting OK. If the Tag Browser is set to allow selection of zero tags, <none> will be presented as an option at the top of the tag list. This mode is used for selecting pens for trending where assigning zero tags to a pen is a valid operation.

2.1.1.6 Pre-filtered tags

A base filter can be applied to the Tag Browser Tag List Control, restricting the set of tags available for display. For example, this is used in the historical trend to display and allow selection of historically logged tags only. This filter applies to the tag list only, not to the tree pane.

2.1.2 State Information 2.1.2.1 Persistent State

State information will be persisted to a stream handed to the Tag Browser by the calling process. All filters and tag sources defined within the Tag Browser or its sub-dialogs are stored in this file. For InTouch, this information will be streamed to a file kept with the individual InTouch application in the application folder.

2.1.2.2 Context Driven State

These are the properties of the Tag Browser dialog that the client application can set before displaying the Tag Browser dialog.

2.1.2.2.1 Local Tag Source

A tag source can be passed to the Tag Browser to set the local tag source to the current InTouch application.

2.1.2.2.2 Selected App/Tag/Dot Field

The client application can set the initially selected tag source, tag and dot field by passing them to the Tag Browser. WindowMaker will use this feature to set the selected tag when the "Select" button is pressed from its Tagname Dictionary dialog.

2.1.3 Tag List Control

The Tag List Control is used to display and select tags within the current browsing scope.

Multiple selection is not allowed in this control. The control will be displayed in either list view (small icon), or details view (report) depending on the state of the list/details buttons. When switching views, this control will keep its current selection visible. Standard UI of selecting a list item by typing the first few letters of a tag name will be used for this control. When focus is removed from the tag list control, the selected tag will remain highlighted. Tags in this control will initially be sorted alphabetically by tagname.

2.1.3.1 List View

Small icons will be displayed next to the tags with icons displayed according to the tag type of each tag. No other fields will be displayed in this view. If switching from Report View, the sort order will be preserved.

2.1.3.2 Detail View

If selected to display in report view, the tags will be displayed in the multiple column format. Columns initially included are "Tagname", "Tag Type", "Access Name", "Alarm Group", and "Comment". The columns can be sorted by clicking on the headers from the detail view. An item can be selected by clicking on any portion of its displayed element, not just the tagname. A selection bar will highlight the entire row when selected.

2.1.4 Tag Source Droplist

The Tag Source droplist is used to select which tag source will be used to populate the tag list control. The default selection for this control will be "<local>". Tag sources can be added and removed from the list by using the adjacent Define . . . button. When the selection is changed, the tags for the selected tag source will be displayed in the tag list control. If the Tag Source Tree View Pane is displayed, the same tag source will be highlighted in the Tag Source Tree View Pane.

2.1.5 Define Tag Sources

The Define Tag Sources . . . button, adjacent to the Tag Source Droplist control, will bring up the modal Define Tag Sources Dialog (see 2.2 Define Tag Sources Dialog below). When the Define Tag Sources Dialog has returned, the Tag Source Droplist control will be refreshed, and if its current selection is no longer in the group of configured applications, the Tag Source Droplist selection will return to its default selection.

2.1.6 Tag Source Tree View Pane

A Tag Source Tree View Pane will be included. All configured tag dictionaries (InTouch, InSQL, etc.) will be displayed in the first level of the hierarchy. The second level of the hierarchy will display data sources configured for the respective tag dictionaries. Selecting a tag source will perform the same action as changing the Tag Source from the Tag Source Droplist.

2.1.7 List View and Details View Buttons

The List View and Details View buttons together form a radio button group. Exactly one of the two buttons will be in its "on" state (depressed) at any given time. Using these buttons will cause the Tag List control to switch views.

2.1.8 Dot Field Droplist

The drop field droplist will only be enabled when exactly one tag is selected. It will contain a 30 list of all dot fields contained within the selected tag. The default value for this control will be "<none>". When a new tag is selected from the Tag List control the selected item for this control will remain the same, unless it is invalid for the selected tag, in which case selected item will revert to "<none>".

2.1.9 Filter Droplist

The Filter Droplist is used to select which filter to apply to the Tag List control. It will be populated with all user-defined filters. The first entry of this list is "<none>", which means that no filter will be applied to the Tag List, and all available tags will be displayed. When a filter is selected, the Tag List control will be repopulated using the new filter. Note that the base tag filter is always applied before the user filter. So the user filter can only reduce the set of tags displayed.

2.1.10 Define Filter Button

The Define Filter Button will bring up the Define Tag Filter Dialog (see 2.4 below). If a filter is defined using the Define Tag Filter Dialog, it will be added to the filter droplist, and then selected. Two wild cards can be used in order to facilitate filtering. The "*" can be used to represent multicharacters and the "?" can be used to represent a single character. For example, a tag name filter of T?me* could return (if such names are in the item list) such items as Time, Tome, TimeStart, etc.

2.1.11 OK Button

Exactly one tag must be selected from the Tag List control for the OK action to complete successfully. If zero tags are selected when OK is pushed, the dialog will display the message dialog "Please select a tag" and return the user to this dialog. If exactly one tag is selected, the Tag Browser dialog will close and return the selected tag and dot field to the calling process. The returned values will include the tagname, the tag ID (handle for InTouch), the dot field name and ID, and the access name associated with the tag source that the tag was chosen from. If the chosen tag is a member of a Super Tag, the fully qualified name for that tag will be returned.

2.1.12 Cancel Button

The Cancel button will always be visible and enabled. When this button is pushed, the Tag Browser dialog will close and not return a tag to the calling process.

2.1.13 Status Bar

The status bar will be located on the bottom of the dialog. It will include a right hand stretch handle. The following status items will be indicated on the status bar:

Total number of items in the Tag List Control.

Name of currently selected tag if one tag selected, or the number of tags selected if zero or multiple tags are selected.

The dot field name selected, if any.

The access name associated with the tag source that the selected tag is associated with.

2.2 Define Tag Sources Dialog

Figure 22:
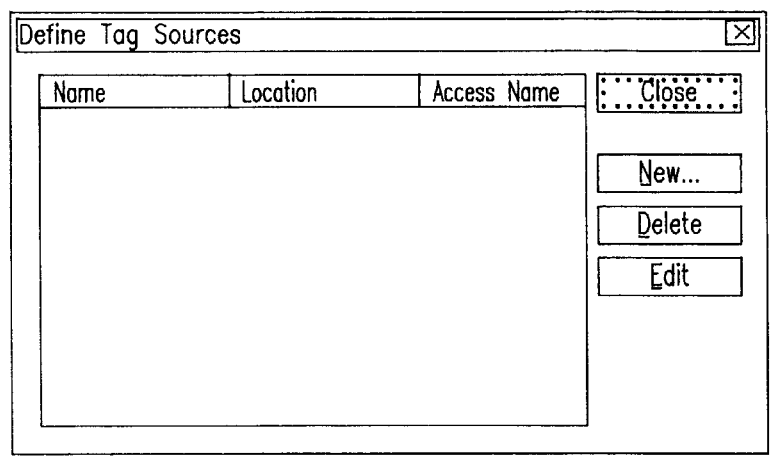

Referring to FIG. 22, the Define Tag Sources Dialog is used to specify tag sources to be used. This is a modal fixed size dialog.

2.2.1 Tag Sources List

This will show a list of the currently configured tag sources. It will show the local name for the tag source, the data source string, and the DDE node name for the tag source. It is a multiple selection list control.

2.2.2 Close Button

The close button is always active. It will close the dialog when pushed.

2.23 New . . . Button

This button is always enabled. It will invoke the Define Tag Source Dialog (see 2.3 below). If a new app is created, it will be reflected in the Tag Sources List.

2.2.4 Edit Button

This button is enabled when exactly one tag source is selected. It will invoke the Define Tag Source Dialog (see 2.3 below) for the selected tag source. If the tag source is successfully edited, the changes will be reflected in the Tag Sources List.

2.2.5 Delete Button

This button will be enabled when one or more tag sources are selected in the tag source list. When pushed it will confirm the deletion, then delete the tag sources selected in the Tag Sources List.

2.3 Define Tag Source Dialog

Figure 23:
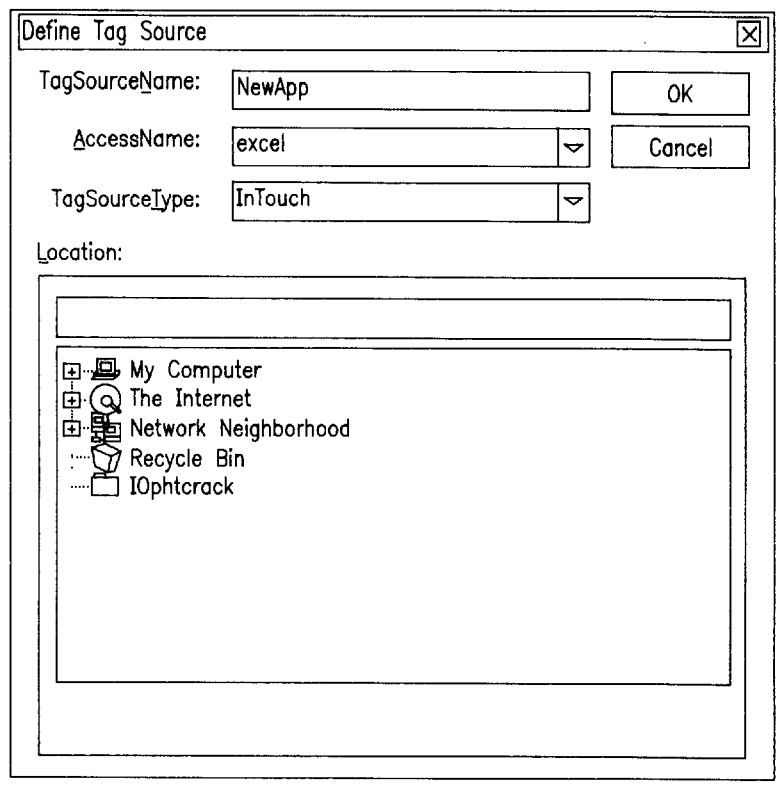

FIG. 23 provides a screen shot of an exemplary Define Tag Source Dialog. This modal dialog will allow the user to enter in the information to define a tag source including the access name, a user defined tag source name, and data source information that is custom for each FactorySuite application type. This dialog will return the selected tag source, Access name, and data source selected to the calling process.

2.3.1 OK Button

On selecting OK, the dialog will check for valid input, then close. If the input is invalid, the user will be notified and focus will be given to the invalid input. Valid input is defined as follows:

The tag source name entered must not already be defined.

The Network DDE Access name must exist.

The application path entered must exist and be accessible.

If the application path entered is on the local machine, the user will be warned that it is probably an invalid selection.

2.3.2 Cancel Button

Will close this dialog without affecting the calling process.

2.3.3 Tag Source Name Edit Control

Allows the user to type in an alias for the tag source. This alias must be unique.

2.3.4 Access Names Droplist

This droplist control will be populated with the list of all Access names available in the current application. Selecting one will define the Access name for the tag source.

2.3.5 Tag Source Location Control

The contents of this control will be filled in differently for each FactorySuite application type. Information entered in this control by the user will be sufficient to bind to that data source and read tag definitions.

2.4 Define Tag Filter Dialog

Figure 24:
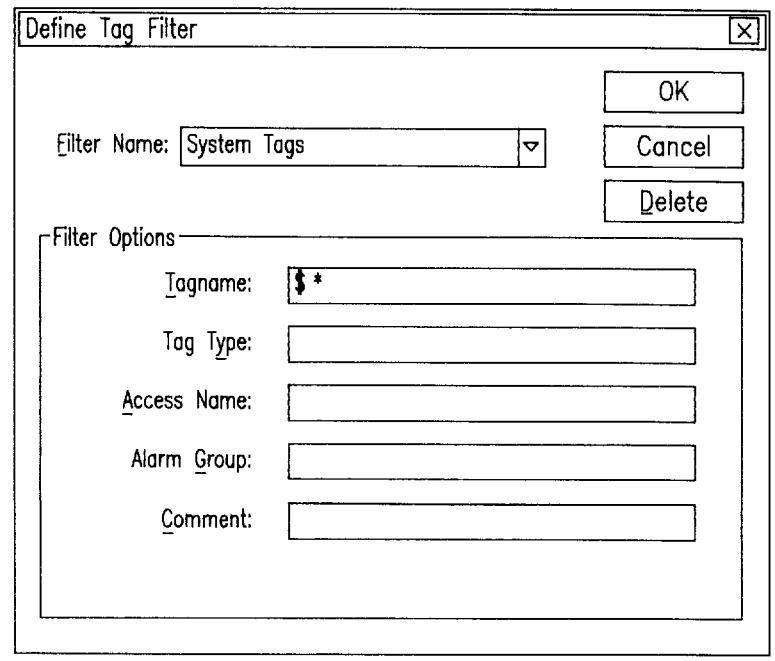

Referring to FIG. 24, the Define Tag Filter Dialog is used to define filters that can be applied to the population of the Tag List control. This is a modal fixed size dialog.

2.4.1 OK Button

On selecting OK. The dialog will check for valid input, then close. If the input is invalid, the user will be warned and focus will be given to the invalid input. The non-blank Filter Name defines a valid entry. If a new filter name has been entered, this filter will be added to the list of available filters.

2.4.2 Cancel Button

Will close this dialog without affecting the calling process.

2.4.3 Delete Button

If the Filter Name exists, the Delete Button will be enabled. If selected the program will delete the Filter Name specified in the Filter Name Edit Control.

2.4.4 Filter Name Edit Control

Allows the user to type in name that identifies the filter with the filter options. This name must be unique.

2.4.5 Filter Options

Filter options allows the user to enter filter strings for various fields in a tag. When applying a filter to a tag, each filter string entered will be evaluated separately and then all results will be logically anded together to determine whether a tag will be included. Filter strings can be applied to the following fields:

Tagname

Tag Type

Access Name

Alarm Group

Comment

2.4.5.1 Filter String Syntax

The filter strings for the various tagname fields will all follow the same syntax. Strings will be matched ignoring case. Wild cards "*" and "?" can be used anywhere in the filter string, any number of times. The "*" wildcard matches any sequence of zero or more characters, and the "?" wildcard matches any single character.

Although the above application has been described primarily in terms of particular embodiments and implementations, those skilled in the art will appreciate that alternate embodiments and implementations may be utilized to effect the objectives of the present invention. Thus the application is meant only to be limited by the scope of the appended claims.

What is claimed is:

1. A system for providing representations of one or more tag sources associated with corresponding component devices, said system comprising:

a tag dictionary for defining a first of said tag sources in a predefined format, said tag dictionary including tag definition objects containing information relating to said first of said tag sources; and a tag browser for displaying a representation of said first of said tag sources based upon said tag definition objects, said representation including information relating to a predefined set of parameters characterizing said first of said tag sources wherein said first of said tag sources is instantiated so as to enable interaction with said tag browser.

2. The system of claim 1 wherein each of said tag definition objects is associated with a tag type object.

3. The system of claim 2 wherein each said tag type object comprises a collection of dot field objects.

4. The system of claim 1 wherein said tag dictionary implements a method disposed to return a unique identifier from each of said tag sources, each of said tag sources being implemented as an object-oriented control.

5. The system of claim 1 further including means for generating a template tag dictionary, said template tag dictionary being capable of modification to reflect attributes of said tag sources.

6. The system of claim 1 further including means for generating template object-oriented controls of a predefined format compatible with said tag dictionary, said tag sources being represented by instantiated ones of said template object-oriented controls.

7. The system of claim 1 wherein said tag browser includes a tag filter for causing display of only said representations of said one or more tag sources comporting with tag selection criteria, and for suppressing display of all other ones of said representations.

8. The system of claim 7 wherein said tag filter includes means for generating a non- deterministic finite automation disposed to accept identifiers of said tag sources comporting with said tag selection criteria, said tag filter displaying said representations corresponding to said identifiers comporting with said tag selection criteria and suppressing display of representations of all other such representations.

9. The system of claim 1 wherein each of said in sources is instantiated as an object-oriented control having properties and methods facilitating interaction with said tag dictionary.

10. The system of claim 1 wherein said tag dictionary is instantiated upon selection of said first of said tag sources upon selection of said first of said tag sources through said tag browser.

11. A program product for use in a computer system, the program product comprising:

a signal bearing media; and a sequence of instructions executable by the computer system, the sequence providing a tag dictionary for defining a first tag source in a predefined format, said tag dictionary including tag definition objects containing information relating to said first tag source wherein said first of said tag sources is instantiated so as to enable interaction with said tag dictionary, and a tag browser for displaying a representation of said first tag source based upon said tag definition objects, said representation including information relating to a predefined set of parameters characterizing said first tag source.

12. The program product as defined in claim 11, wherein the tag browser further includes a tag filter for causing display of only said representations of said one or more tag sources comporting with tag selection criteria, and for suppressing display of all other ones of said representations.

13. A tag provider for displaying representations of a plurality of tag sources associated with a corresponding plurality of component devices, said tag provider comprising a tag dictionary for defining a first of said tag sources in a predefined object-oriented format enabling interaction with said tag dictionary, said tag dictionary including tag definition objects containing information relating to said first of said tag sources wherein each of said tag definition objects is associated with a tag type object; and a tag browser for displaying and editing a representation of said first of said tag sources in accordance with one of said tag definition objects, said representation including information relating to a predefined set of parameters characterizing said first of said tag sources.

14. The tag provider of claim 13 wherein said tag browser further includes tag filter for causing display of only said representations of said one or more tag sources comporting with tag selection criteria, and for suppressing display of all other ones of said representations.

15. A method for providing representations of one or more tag sources associated with corresponding component devices, said method comprising the acts of:

defining a tag dictionary including tag definition objects containing information relating to a first of said tag sources wherein said first of said tag sources is instantiated so as to enable interaction with said tag dictionary; and displaying a representation of said first of said tag sources based upon said tag definition objects, said representation including information relating to predefined set of parameters characterizing said first of said tag sources.

16. The method of claim 15 further including the act of associating a tag type object with each of said tag definition objects.

17. The method of claim 15 further including the acts of displaying only said representations of said one or more tag sources comporting with tag selection criteria, and suppressing display of all other ones of said representations.

18. The method of claim 15 further including the act of generating a template tag dictionary and modifying said template tag dictionary to reflect attributes of said tag sources.

19. A tag dictionary for use with an application program disposed to monitor a plurality of tag sources, said tag dictionary comprising:

a plurality of tag definition objects containing information relating to associated ones of said tag sources, each of said tag sources being instantiated so as to enable interaction with said tag dictionary; and a plurality of tag type objects, each of said tag type objects (i) being associated with a corresponding one of said tag definition objects, and (ii) including a collection of dot field objects.

20. The tag dictionary of claim 19 further including means for implementing a method for returning a unique identifier from each of said tag sources in response to a query by said application program wherein each of said tag sources is implemented as an object-oriented control.

21. A system for providing representations of a first set of tag sources associated with a first set of corresponding component devices operating in accordance with a first protocol and of a second set of tag sources associated with a second set of corresponding component devices operating in accordance with a second protocol differing from said first protocol, said system comprising:

a first tag dictionary for defining said first set of tag sources, said first tag dictionary including tag definition objects containing information relating to associated ones of said first set of tag sources;

a second tag dictionary for defining said second set of tag sources, said second tag dictionary including tag definition objects containing information relating to associated ones of said second set of tag sources; and a tag browser for displaying said representations of said first set of tag sources and of said second set of tag sources.

22. A system for providing representations of one or more tag sources associated with corresponding component devices, said system comprising:

a tag dictionary for defining said tag sources in a redefined format, said tag dictionary including tag definition objects containing information relating to associated ones of said tag sources; and a tag browser for displaying said representations of said tag sources based upon said tag definition objects, said representations including information relating to a predefined set of parameters characterizing said tag sources wherein said tag sources are instantiated so as to enable interaction with said tag browser.

* * * * *